United States Patent
Mushynski et al.

(10) Patent No.: US 10,032,380 B2
(45) Date of Patent: Jul. 24, 2018

(54) PEDESTRIAN-VEHICLE SAFETY SYSTEMS FOR LOADING DOCKS

(71) Applicants: Alan Mushynski, Brookfield, WI (US); Matthew Sveum, Wauwatosa, WI (US)

(72) Inventors: Alan Mushynski, Brookfield, WI (US); Matthew Sveum, Wauwatosa, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 0 days.

(21) Appl. No.: 15/286,177

(22) Filed: Oct. 5, 2016

(65) Prior Publication Data

US 2018/0096603 A1    Apr. 5, 2018

(51) Int. Cl.
*B60Q 1/00* (2006.01)
*G08G 1/16* (2006.01)

(52) U.S. Cl.
CPC .................................. *G08G 1/166* (2013.01)

(58) Field of Classification Search
None
See application file for complete search history.

(56) References Cited

U.S. PATENT DOCUMENTS

| | | |
|---|---|---|
| 3,832,709 A | 8/1974 | Klein et al. |
| 4,704,610 A | 11/1987 | Smith et al. |
| 4,928,101 A | 5/1990 | Favors |
| 5,016,017 A | 5/1991 | Kodera et al. |
| 6,614,536 B1 | 9/2003 | Doemens et al. |
| 8,547,234 B2 | 10/2013 | Maly et al. |
| 8,806,689 B2 | 8/2014 | Riviere et al. |
| 2002/0041231 A1 | 4/2002 | Drinkard |
| 2002/0118232 A1 | 8/2002 | Watanabe et al. |

(Continued)

FOREIGN PATENT DOCUMENTS

| | | |
|---|---|---|
| EP | 0855324 | 7/1998 |
| EP | 1775692 | 4/2007 |

(Continued)

OTHER PUBLICATIONS

United States Patent and Trademark Office, "Advisory Action," issued in connection with U.S. Appl. No. 14/317,824, dated Jun. 15, 2017, 10 pages.

(Continued)

*Primary Examiner* — Adolf Dsouza
(74) *Attorney, Agent, or Firm* — Hanley, Flight & Zimmerman, LLC

(57) ABSTRACT

An example system includes pedestrian sensors to monitor a first pedestrian zone and a second pedestrian zone in front of a dock face of a loading dock. A first vehicle detector is to detect a vehicle near the first pedestrian zone and a second vehicle detector is to detect the vehicle near the second pedestrian zone. A sensor manager is to disable the first pedestrian zone when the first vehicle detector detects the vehicle approaching the first pedestrian zone and the at least one pedestrian sensors does not detect the pedestrian in the first pedestrian zone. The sensor manager is to disable the second pedestrian zone when the second vehicle detector detects the vehicle approaching the second pedestrian zone and at least one of the at least pedestrian sensors does not detect the pedestrian in the second pedestrian zone.

28 Claims, 7 Drawing Sheets

(56) References Cited

U.S. PATENT DOCUMENTS

| | | |
|---|---|---|
| 2002/0148952 A1 | 10/2002 | Tatum et al. |
| 2002/0190849 A1 | 12/2002 | Orzechowski |
| 2004/0075046 A1 | 4/2004 | Beggs et al. |
| 2004/0098224 A1 | 5/2004 | Takahashi |
| 2005/0073438 A1 | 4/2005 | Rodgers et al. |
| 2005/0140319 A1 | 6/2005 | Takashima |
| 2006/0137261 A1 | 6/2006 | Maly |
| 2006/0162254 A1 | 7/2006 | Imai et al. |
| 2006/0187037 A1 | 8/2006 | Eubelen et al. |
| 2007/0001830 A1 | 1/2007 | Dagci et al. |
| 2007/0008124 A1 | 1/2007 | Stadler et al. |
| 2007/0182550 A1 | 8/2007 | Castello et al. |
| 2008/0022596 A1 | 1/2008 | Boerger et al. |
| 2008/0127435 A1 | 6/2008 | Maly et al. |
| 2008/0158354 A1 | 7/2008 | Hutchison |
| 2008/0223667 A1 | 9/2008 | Tinone et al. |
| 2008/0272955 A1 | 11/2008 | Yonak et al. |
| 2008/0272995 A1 | 11/2008 | Sakaguchi et al. |
| 2010/0054535 A1 | 3/2010 | Brown et al. |
| 2010/0123558 A1 | 5/2010 | Park et al. |
| 2010/0162285 A1 | 6/2010 | Cohen et al. |
| 2011/0035199 A1 | 2/2011 | Kristofik et al. |
| 2011/0220439 A1 | 9/2011 | Bellota |
| 2012/0025964 A1 | 2/2012 | Beggs et al. |
| 2012/0045090 A1 | 2/2012 | Bobbitt et al. |
| 2012/0146792 A1 | 6/2012 | De Luca et al. |
| 2013/0257607 A1 | 10/2013 | Rigby et al. |
| 2013/0312205 A1 | 11/2013 | Riviere et al. |
| 2015/0375947 A1* | 12/2015 | Hochstein .............. B60Q 9/002 348/143 |
| 2015/0382432 A1 | 12/2015 | Eskonen et al. |

FOREIGN PATENT DOCUMENTS

| | | |
|---|---|---|
| EP | 2206664 | 7/2010 |
| EP | 2465796 | 6/2012 |
| GB | 2119987 | 11/1983 |
| WO | 2012084919 | 6/2012 |

OTHER PUBLICATIONS

United States Patent and Trademark Office, "Final Office Action," issued in connection with U.S. Appl. No. 14/317,824, dated Mar. 31, 2017, 50 pages.

IFM, "3D Image Sensor," 1998-2015, retrieved Jan. 27, 2015 [http://www.ifm.com/ifmus/web/pmd3d-portal1.htm; http://www.ifm.com/ifmus/web/padv/020_020_010_010_010_010.html; http://www.ifm.com/ifmus/web/news/pnews_8r3n6b.html; http://www.ifm.com/ifmus/web/news/pnews_8t9jh3.html], 7 pages.

Bea, "Sparrow: Unidirectional opening sensor for automatic industrial doors," Jan. 2010, last retrieved on Jan. 17, 2015, [http://www.bea-industrial.be/uploads/docs/manuals/ug_sparrow_en_vl.pdf], 2 pages.

Bea, "Sparrow: Opening Sensor for Industrial Doors Commercial Sheet," last retrieved on Jan. 27, 2015, [http://www.bea-industrial.be/uploads/docs/product_sheets/ind_cs_sparrow_en_vl_web.pdf], 2 pages.

Bea, "LZR-I100/-I110 Laser Scanners for Industrial Doors," May 2011, last retrieved on Jan. 27, 2015, [http://www.bea-industrial.be/uploads/docs/manuals/ug_lzr-100-110_en_v5.pdf], 12 pages.

Bea, "LZR—i100 Safety Sensor for Industrial Doors Commercial Sheet," last retrieved on Jan. 27, 2015, [http://www.bea-industrial.be/uploads/docs/product_sheets/ind_cs_LZR-i100_en_v1_web.pdf], 2 pages.

Bea, "LZR—i110 Safety Sensor for Industrial Doors Commercial sheet," last retrieved on Jan. 27, 2015, [http://www.bea-industrial.be/uploads/docs/product_sheets/ind_cs_LZR-i110_en_v1_web.pdf], 2 pages.

Bea, "Falcon/-XL Opening sensor for automatic industrial doors," last retrieved on Jan. 27, 2015, [http://www.bea-industrial.be/uploads/docs/manuals/ug_falcon_en_v3.pdf], 2 pages.

Bea, "Falcon: Opening Sensor for Industrial Doors Commercial sheet," last retrieved on Jan. 27, 2015, [http://www.bea-industrial.be/uploads/docs/product_sheets/ind_cs_falcon_falconx1_en_v1_web.pdf], 2 pages.

Bea, "LZR i30 Safety Sensor for Industrial Doors," Nov. 22, 2013, last retrieved on Jan. 27, 2015, [http://www.beainc.com/wp-content/themes/bea/documents/79.0006.04.EN%20LZR-i30%2020131122.pdf], 2 pages.

Pepperl & Fuchs, "Ultrasonic sensor UC4000-30GM-IUR2-V15 Technical data," Aug. 12, 2014, last retrieved on Jan. 27, 2015, [http://files.pepperl-fuchs.com/selector_files/navi/productInfo/edb/104094_eng.pdf], 5 pages.

Pepperl & Fuchs, "Multi-Ray LED Scanner OMD8000-R2100-R2-2V15 Dimensions," Sep. 25, 2014, last retrieved on Jan. 27, 2015, [http://files.pepperl-fuchs.com/selector_files/navi/productInfo/edb/264888_eng.pdf], 3 pages.

Crawford Hafa, "Hafa Eye Operating Manual," Mar. 31, 2005, 29 pages.

Patent Cooperation Treaty, "International Search Report," issued in connection with PCT Patent Application No. PCT/US2015/037367, dated Sep. 15, 2015, 8 pages.

Patent Cooperation Treaty, "Written Opnion," issued in connection with PCT Patent Application No. PCT/US2015/037367, dated Sep. 15, 2015, 8 pages.

Patent Cooperation Treaty, "International Preliminary Report on Patentability," issued in connection with PCT Patent Application No. PCT/US2015/037367, dated Jan. 5, 2017, 10 pages.

United States Patent and Trademark Office, "Non-Final Office Action," issued in connection with U.S. Appl. No. 14/317,824, dated May 11, 2016, 52 pages.

United States Patent and Trademark Office, "Final Office Action," issued in connection with U.S. Appl. No. 14/317,824, dated Aug. 23, 2016, 33 pages.

United States Patent and Trademark Office, "Non-Final Office Action," issued in connection with U.S. Appl. No. 14/317,824, dated Nov. 25, 2016, 39 pages.

United States Patent and Trademark Office, "Notice of Allowance," issued in connection with U.S. Appl. No. 14/317,824, dated Nov. 15, 2017, 23 pages.

International Searching Authority, "International Search Report", issued in connection with International Application No. PCT/US2017/054951, dated Dec. 20, 2017, 4 pages.

International Searching Authority, "Written Opinion", issued in connection with International Application No. PCT/US2017/054951, dated Dec. 20, 2017, 6 pages.

Canadian Intellectual Property Office, "Office Action", issued in connection with Canadian Application No. 2,952,730, dated Dec. 29, 2017, 4 pages.

IP Australia, "Notice of Acceptance," issued in connection with Australian Application No. 2015280046, dated Jan. 3, 2018, 4 pages.

United States Patent and Trademark Office, "Corrected Notice of Allowability," issued in connection with U.S. Appl. No. 14/317,824, dated Feb. 26, 2018, 6 pages.

\* cited by examiner

PEDESTRIAN-VEHICLE SAFETY SYSTEMS FOR LOADING DOCKS

FIELD OF THE DISCLOSURE

The present disclosure relates generally to loading dock safety systems and, more specifically, to pedestrian-vehicle safety systems for loading docks.

BACKGROUND

Typical loading docks provide an area for a truck to back up into for transferring cargo between the truck and the building. Some loading docks include equipment such as dock levelers and/or vehicle restraints. Dock levelers provide an adjustable platform and/or ramp between the dock and the truck bed. Vehicle restraints help prevent a truck from prematurely driving away from the platform during loading/unloading operations.

DETAILED DESCRIPTION

Figure 1:
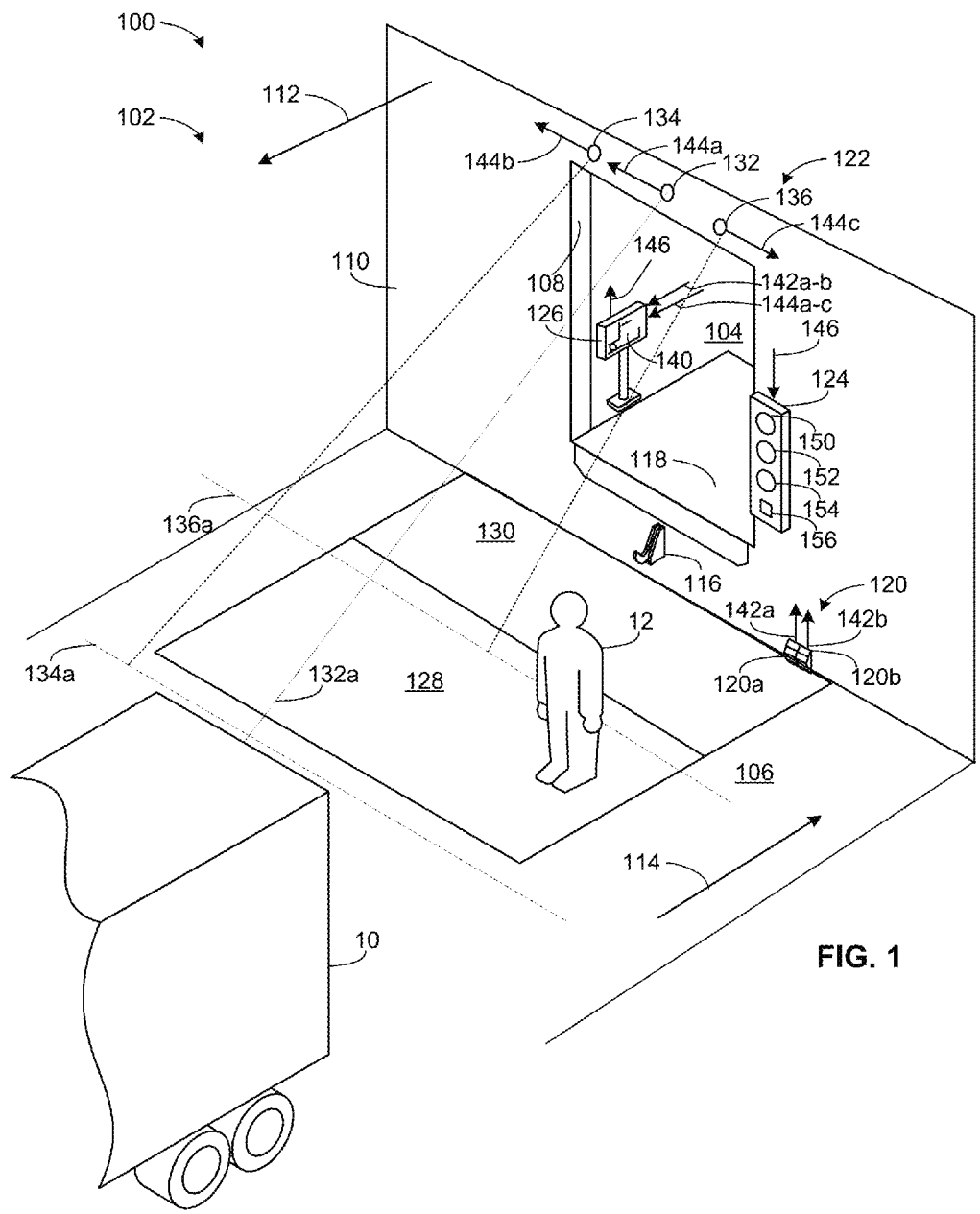
FIG. 1 is a perspective view of an example loading dock implemented with an example safety system constructed in accordance with the teachings disclosed herein.

Example safety systems and related methods for use at loading docks are disclosed. Some example safety systems disclosed herein employ sensors, sensing systems, electronic systems, signal devices, and/or control systems to prevent or reduce a likelihood of a collision between a vehicle and a person at a loading dock. In some examples, the sensors disclosed herein detect whether a vehicle is approaching a dock, leaving the dock, and/or is parked at the dock. In some examples disclosed herein, warning signals provide variable outputs reflecting a magnitude or urgency of certain potential conditions (e.g., reflecting the level of danger, threat and/or likelihood of an accident, etc.). Some example methods and systems disclosed herein provide non-emergency alert signals that notify personnel that a vehicle is present at the dock but is either stopped or restrained relative to the dock area. Some example methods and systems disclosed herein provide a graphical indoor display that presents outdoor operating conditions.

Example safety systems disclosed herein significantly improve the sensing accuracy associated with a loading dock. For instance, example safety systems disclosed herein reduce (e.g., prevent) instances of activation of alarms or other warning outputs due to vehicle presence when pedestrians are not present as compared to prior systems. In some example safety systems disclosed herein, a pedestrian zone adjacent a loading dock is monitored (e.g., via a pedestrian sensor) to detect a presence of a pedestrian within the pedestrian zone. In some such example safety systems disclosed herein, a vehicle detector is associated with or corresponds to the pedestrian zone and monitors a disable zone adjacent (e.g., in front of, further away from the dock than) the pedestrian zone to detect the presence of a vehicle at the disable zone. In other words, a disable zone is monitored by a dedicated vehicle detector. The disable zone is an area outside of (e.g., outside of a perimeter or area defined by) the pedestrian zone. The disable zone leads the pedestrian zone relative to the dock such that a truck backing toward the dock will traverse the disable zone before entering the pedestrian zone. As such, the vehicle detector detects the presence of the vehicle prior to the vehicle entering the pedestrian zone that is associated with the vehicle detector. When the example safety systems disclosed herein do not detect a pedestrian in the pedestrian zone (e.g., via the pedestrian sensor), if the vehicle detector detects the presence of the vehicle in the disable zone, the safety system deactivates or prevents activation of a pedestrian alarm because no pedestrian is in danger. For instance, the example safety systems disclosed herein may be configured to deactivate, disable or discontinue monitoring (e.g., temporarily turns off the pedestrian sensor associated with) the pedestrian zone. In some examples, to deactivate, disable or discontinue monitoring the pedestrian zone, the example safety systems disclosed herein ignore signals from a sensor associated with the pedestrian zone.

FIG. 1 is a perspective view of an example loading dock 100 implemented with an example safety system 102 in accordance with the teachings of this disclosure. The safety system 102 of the illustrated example prevents or reduces a likelihood of a collision between a vehicle 10 and a person 12 at the loading dock 100. Example vehicles 10 include, but are not limited to, a truck, a trailer, an open trailer bed, an enclosed trailer bed, and/or a lorry. The term, "person" or "pedestrian" may be used interchangeably and refer to any human individual such as a dock worker or a pedestrian, a forktruck driver, or other vehicle operator.

The loading dock 100 of the illustrated example includes an indoor area 104, an outdoor area 106, a doorway 108, and a dock face 110. The dock face 110 of the illustrated example generally faces in a forward direction 112 toward the outdoor area 106. As a vehicle 10 backs up toward the dock face 110, the vehicle 10 travels or moves in a rearward direction 114 towards the dock face 110. The loading dock 100 of the illustrated example includes a vehicle restraint 116 and a dock leveler 118. To facilitate transferring cargo between the vehicle 10 and the indoor area 104, the dock leveler 118 provides an adjustable bridge (e.g., a platform or ramp) dimensioned to span a gap that might exist between the dock face 110 and a rear edge of the vehicle 10. To help prevent the vehicle from prematurely pulling away from the dock face 110 during loading and/or unloading operations, the vehicle restraint 116 may selectively engage a vehicle's rear impact guard (RIG or ICC bar), a tire, and/or some other portion of the vehicle 10.

The safety system 102 of the illustrated example includes a pedestrian scanner system 120 (e.g., a pedestrian sensor), a vehicle sensor system 122 (e.g., a vehicle sensor), an outdoor signal device 124, and an indoor signal device 126. In particular, the pedestrian scanner system 120 attempts to detect a presence of a person 12 and the vehicle sensor system 122 attempts to detect the presence of the vehicle at the loading dock 100.

To detect the presence of a person 12 in the vicinity of the dock face 110, the pedestrian scanner system 120 of the illustrated example monitors a plurality of pedestrian zones adjacent the dock face 110. For example, the pedestrian scanner system 120 of the illustrated example provides a first pedestrian zone 128 (e.g., a first area) and a second pedestrian zone 130 (e.g., a second area) adjacent the dock face 110. As described in greater detail below in connection with FIG. 2, the forward edge of the first pedestrian zone 128 of the illustrated example is located a distance from the dock face 110 that is greater than a distance at which the forward edge of the second pedestrian zone 130 is located from the dock face 110. The term, "pedestrian zone" refers to an area and/or a range within which a sensor monitors a person 12 positioned within one of the first pedestrian zone 128 or the second pedestrian zone 130 will be detected by (e.g., cause a signal to be generated by) a corresponding sensor.

The pedestrian scanner system 120 of the illustrated example includes a first pedestrian scanner 120*a* (e.g., a first sensor) to monitor the first pedestrian zone 128 and a second pedestrian scanner 120*b* (e.g., a second sensor) to monitor the second pedestrian zone 130. In the example of FIG. 1, the first pedestrian scanner 120*a* and/or the second pedestrian scanner 120*b* of the illustrated example are located or positioned adjacent the dock face 110 (e.g., near a lower corner of the loading dock 100). In some examples, the first pedestrian scanner 120*a* and the second pedestrian scanner 120*b* are configured to detect any object (e.g., the person 12) within a respective one of the first pedestrian zone 128 and the second pedestrian zone 130. In some examples, the first pedestrian scanner 120*a* provides a first laser field to define the first pedestrian zone 128 and the second pedestrian scanner 120*b* provides a second laser field to define the second pedestrian zone 130. In some examples, the pedestrian scanner system 120 may effectively merge the first and second pedestrian zones and include a single sensor to monitor the combined area of the first pedestrian zone 128 and the second pedestrian zone 130. In some examples, the safety system 102 and/or the pedestrian scanner system 120 may include more than two pedestrian zones provided by a plurality of pedestrian scanners and/or sensors. Although the first and second pedestrian zones 128, 130 are shown by lines in FIG. 1, it will be understood that the lines may not be visible in the environment but instead represent an area covered by a corresponding sensor.

To detect a presence of the vehicle 10 at the loading dock 100 and/or approaching the dock face 110, the vehicle sensor system 122 of the illustrated example includes a vehicle monitor sensor 132. The vehicle monitor sensor 132 of the illustrated example provides a sensing projection 132*a* (e.g., a light beam) that extends beyond the first pedestrian zone 128 (e.g., a distance away from the dock face 110 that is greater than a distance to which the forward edge (e.g., furthest from the dock) of the first pedestrian zone 128 projects from the dock face 110. In the illustrated example, the vehicle monitor sensor 132 is located (e.g., centrally located) above the doorway 108 (e.g., above a shelter or header of the loading dock 100). In some examples, the vehicle monitor sensor 132 is a motion sensor. In some examples, the vehicle monitor sensor 132 monitors an area (e.g., that is in front of a forward edge (e.g., furthest from the dock) of the first pedestrian zone 128) that is approximately between 25 feet and 35 feet from the dock face.

Additionally, to detect a vehicle 10 near, in front of and/or approaching the first pedestrian zone 128, the vehicle sensor system 122 of the illustrated example includes a first vehicle detector 134 (e.g., a sensor). The first vehicle detector 134 monitors a first trigger boundary or line 134*a* to define a first disable zone or area in front of (i.e., on the vehicle side opposite to the dock side) the first pedestrian zone 128 to detect the presence of the vehicle 10 prior to the vehicle 10 entering the first pedestrian zone 128.

To detect the vehicle 10 near, in front of and/or approaching the second pedestrian zone 130, the vehicle sensor system 122 of the illustrated example includes a second vehicle detector 136 (e.g., a sensor). The second vehicle detector 136 monitors a second trigger boundary or line 136*a* (e.g., a second disable zone) to define a second disable zone in front of the second pedestrian zone 130 to detect the presence of the vehicle 10 prior to the vehicle 10 entering the second pedestrian zone 130. The first vehicle detector 134 and/or the second vehicle detector 136 of the illustrated example are coupled to the dock face 110 above the doorway 108 (e.g., above a header or shelter of the loading dock 100). In some examples, the first vehicle detector 134 and/or the second vehicle detector 136 may be located on the vehicle restraint 116 and/or any other location of the loading dock 100, loading dock equipment, and/or building. In some examples, the vehicle sensor system 122 is a single sensor that provides the functions of the vehicle monitor sensor 132, the first vehicle detector 134 and the second vehicle detector 136.

The safety system 102 of the illustrated example includes a controller 140 to control the pedestrian scanner system 120, the vehicle sensor system 122, and/or an output of a signal display device such as, for example, the outdoor signal device 124 and/or the indoor signal device 126. Some example sensing systems and electronic sensor systems include multiple sensors connected in communication with a signal device. For example, response signals from the pedestrian scanner system 120 and/or the vehicle sensor system 122 of the illustrated example are conveyed to or received by the controller 140. The controller 140 of the illustrated example receives an input signal 142*a* associated with the first pedestrian scanner 120*a*, an input signal 142*b* associated with the second pedestrian scanner 120*b*, an input signal 144*a* from the vehicle monitor sensor 132, an input signal 142*b* from the first vehicle detector 134, and/or an input 142*c* from the second vehicle detector 136. Based on the input signals 142*a-b* and 144*a-c*, the controller 140 of the illustrated example provides an output signal 146 to control the indoor signal device 126 and/or the outdoor signal device 124.

The outdoor signal device 124 of the illustrated example includes a first output signal 150 (e.g., a green light), a second output signal 152 (e.g., a yellow light), a third output signal 154 (e.g., a red light) and/or a fourth output signal 156 (e.g., an audible alarm). The indoor signal device 126 may include, for example, a visual display to provide information regarding the vehicle restraint 116, presence of a person in the first pedestrian zone 128 and/or the second pedestrian zone 130, presence of the vehicle 10 at the loading dock 100, outputs similar to the output signals 150-156, etc.

The term, "sensor" refers to any device that can detect the presence and/or movement of a vehicle and/or a person/object. Some example sensors detect or sense the presence of a vehicle and/or a person regardless of whether the vehicle and/or the person are moving. Some example sensors detect or sense movement of the vehicle and/or the person. Some example sensors detect or sense movement of the vehicle and/or the person toward and/or away from the sensor and/or the dock face 110. Example sensors that may be used to sense or detect presence and/or movement include, but are not limited to, active infrared, passive infrared, ultrasonic, radar, microwave, laser, electromagnetic induction, pressure pad, ultra-IR LED, time-of-flight pulse ranging technology, photoelectric eye, thermal, video analytics, and/or any combination(s) thereof. Some example sensors that may be used to implement the systems disclosed herein include, but are not limited to, a model BEA LZR, a model BEA Sparrow, a model BEA Falcon, a model LZR-i100, a model BEA LZR-i30, a model UC4000 Ultrasonic Sensor, and a model R2100 Multi-Beam LED Scanner. The BEA LZR examples are products of BEA Industrial of Belgium, and the R2100 and the UC400 examples are products of Pepperl & Fuchs of Germany. In some examples, the vehicle monitor sensor 132 and/or the vehicle sensor system 122 is a single BEA Falcon microwave motion sensor having a sensing projection 132*a* extending beyond the first pedestrian zone 128. In some examples, the pedestrian scanner system 120 is a multiple LZR-i100 presence sensor.

The term "signal device" refers to any device for communicating information to a person, a driver of a vehicle, and/or any other person and/or other system(s). Examples of a signal device disclosed herein include, but are not limited to, a light, a horn, a buzzer, a vibrator, a cellular phone, a mobile device, an alarm, a graphical display, and/or any combination(s) thereof. Some example signal devices are installed at a stationary location at the outdoor area 106, some example signal devices are installed at a stationary location at the indoor area 104, and/or some example signal devices are portable (e.g., carried by the person 12 and/or a driver of the vehicle 10). In some examples, a cellular phone or mobile device carried within the vehicle 10 and/or by the driver of the vehicle 10 implement such a signal device. Some example signal devices emit various lights that are distinguishable by color, intensity, movement, and/or pattern (e.g., flashing and/or continuous lights). Some example signal devices emit sound(s) which may be distinguishable by volume, pitch, tone, and/or pattern (e.g., intermittent and/or continuous sounds). Some signal devices are haptic devices that vibrate or otherwise move in a manner to be felt by a person wearing or carrying the device.

The term "controller" refers to any circuitry (e.g., wiring, relays, integrated circuit (IC), computer, programmable logic controller, logic circuit, logic gate, processor, microprocessor, etc.). A controller can be used to determine the operation of a signal device (e.g., by causing the output device to provide an output signal) in response to receiving input from one or more sensors (e.g., the pedestrian scanner system 120 and/or the vehicle sensor system 122). The controller 140 of the illustrated example is housed within an enclosure that contains the indoor signal device 126. However, in some examples, the controller 140 is positioned at another location such as a remote location communicatively coupled to the components (e.g., the pedestrian scanner system 120, the vehicle sensor system 122, the outdoor signal device 124 and/or indoor signal device 126, etc.) of the safety system 102. In some examples various parts of the controller 140 are distributed over multiple locations. Example locations of the controller include, but are not limited to, housed within a separate enclosure, housed within an enclosure that contains the outdoor signal device 124, housed within a sensor enclosure, positioned at a remote location such as a control room of a warehouse, and/or various combinations thereof. To provide a compact, robust installation, some examples of the enclosure contain both the outdoor signal device 124 and at least one of the pedestrian scanner system 120 and/or the vehicle sensor system 122.

In operation, the safety system 102 of the illustrated monitors the loading dock area via the pedestrian scanner system 120 and the vehicle sensor system 122. To detect whether a vehicle (e.g., vehicle 10) is in the vicinity of and/or moving toward the dock face 110, the safety system 102 of the illustrated example activates the vehicle monitor sensor 132 to project the sensing projection 132*a* (e.g., in a direction non-parallel relative to the dock face 110) to monitor an area, for example, between approximately 25 to 35 feet away from dock face 110. In some examples, the vehicle monitor sensor 132 may be configured to detect a presence of the vehicle 10 and/or motion of the vehicle 10 in the forward direction 112 and/or the rearward direction 114 relative to the dock face 110.

The safety system 102 of the illustrated example verifies the absence or detects the presence of a person (e.g., person 12) in the first pedestrian zone 128 and/or the second pedestrian zone 130 via the pedestrian scanner system 120 and verifies the absence and/or detects the presence of the vehicle 10 via the vehicle sensor system 122. Based on the input signals 142*a-b* and 144*a-c*, the controller 140 provides an output signal 146 to control an output of the outdoor signal device 124 and/or the indoor signal device 126. For example, based on the input signals 142*a-b* and 144*a-c* received by the controller 140, the controller 140 of the illustrated example activates one or more of the output signals 150-156 of the outdoor signal device 124 and/or activates one or more output signals of the indoor signal device 126.

For example, the controller 140 of the illustrated example causes the outdoor signal device 124 to emit a first output signal 150 (e.g., a green light) when a person (e.g., the person 12) is not detected by the pedestrian scanner system 120 and a vehicle (e.g., the vehicle 10) is not detected by the vehicle sensor system 122. In some examples, the outdoor signal device 124 may emit the first output signal 150 when the vehicle monitor sensor 132 determines that the vehicle 10 is moving in the forward direction 112 away from the dock face 110 (e.g., even if the person 12 is present within (e.g., within a perimeter of) the first pedestrian zone 128 or the second pedestrian zone 130).

In some examples, when a person is not present within the first pedestrian zone 128 and/or the second pedestrian zone 130 while the vehicle monitor sensor 132 detects a vehicle (e.g., the vehicle 10) moving back toward dock face 110, the outdoor signal device 124 of the illustrate example emits a second output signal 152 (e.g., a yellow light). The second output signal 152 of the illustrated example provides a warning that a vehicle (e.g., the vehicle 10) is backing or moving toward the loading dock 100 and a person (e.g., the person 12) that is near the loading dock 100 but outside a perimeter of the first pedestrian zone 128 and the second pedestrian zone 130 and/or the driver of the vehicle 10, should proceed with caution.

In some examples, the outdoor signal device 124 may emit a third output signal 154 (e.g., a red light) when a person (e.g., the person 12) is present within the first pedestrian zone 128 and/or the second pedestrian zone 130 and a vehicle (e.g., the vehicle 10) is not moving (e.g., parked or stationary relative to the dock face 110). For example, the outdoor signal device 124 may emit the third output signal 154 when the vehicle restraint 116 is deployed to restrain a vehicle (e.g., the vehicle 10). In some examples, even when a vehicle (e.g., the vehicle 10) is not present or detected by the vehicle sensor system 122, and a person (e.g., the person 12) is detected within the first pedestrian zone 128 and/or the second pedestrian zone 130, the outdoor signal device 124 still emits the third output signal 154.

In some examples, when the pedestrian scanner system 120 detects and/or senses a person (e.g., the person 12) within the first pedestrian zone 128 and/or the second pedestrian zone 130, and the vehicle sensor system 122 (e.g., the vehicle monitor sensor 132) detects the motion of a vehicle (e.g., the vehicle 10) moving back towards the dock face 110, the outdoor signal device 124 of the illustrated example emits a combination of the third output signal 154 and a fourth output signal 156 (e.g., a red light and audible alarm combination) to warn a driver of the vehicle (which may be moving back or toward the dock face 110) that the person is within the first pedestrian zone 128 and/or the second pedestrian zone 130.

Additionally, as described in greater detail below in connection with FIG. 5, the safety system 102 of the illustrated example respectively deactivates the first pedestrian scanner 120a providing the first pedestrian zone 128 and/or the second pedestrian scanner 120b providing the second pedestrian zone 130 prior to a vehicle (e.g., the vehicle 10) entering the respective first pedestrian zone 128 and/or the second pedestrian zone 130 when: (1) a person (e.g., the person 12) is not present in the first pedestrian zone 128 and a vehicle (e.g., the vehicle 10) triggers the first trigger line (e.g., crosses the first trigger line 134a); and/or a person (e.g., the person 12) is not present in the second pedestrian zone 130 and a vehicle (e.g., the vehicle 10) triggers the second trigger (e.g., crosses the second trigger line 136a). In this manner, the safety system 102 of the illustrated example prevents improper activation of the output signals 150-156 (e.g., alarms) of the outdoor signal device 124 when a vehicle (e.g., the vehicle 10) enters the first pedestrian zone 128 and/or the second pedestrian zone 130 and no person is present in the first pedestrian zone 128 or the second pedestrian zone 130.

For example, as the vehicle 10 moves toward the dock face 110, the vehicle 10 interrupts the first trigger of the first vehicle detector 134 and the safety system 102 (e.g., via the first pedestrian scanner 120a) verifies the absence of a person in the first pedestrian zone 128. If no person is present in the first pedestrian zone 128 when the vehicle 10 passes the first trigger line 134a, the safety system 102 (e.g., the controller 140) of the illustrated example deactivates or disables the first pedestrian zone 128 prior to (e.g., within a foot or inches of) the vehicle 10 entering the first pedestrian zone 128. To deactivate the first pedestrian zone 128, the controller 140 of the illustrated example temporarily turns off the first pedestrian scanner 120a. In some examples, to deactivate the first pedestrian scanner 120a and/or the first pedestrian zone 128, the controller 140 of the illustrated example ignores the input signal 142a provided by the first pedestrian scanner 120a.

As a result, the vehicle 10 does not cause the first pedestrian scanner 120a to sense the vehicle as if it were a person when the vehicle 10 enters the first pedestrian zone 128. In the absence of deactivating (or ignoring signals from) the first pedestrian scanner 120a, the controller 140 would provide an output signal to the outdoor signal device 124 that is representative of a person being present in the first pedestrian zone 128. For example, if the first pedestrian zone 128 is in an activated mode or state (i.e., the first pedestrian scanner 120a is collecting data which is not being ignored) while the vehicle 10 enters the first pedestrian zone 128 and no person is present in the first pedestrian zone 128, the controller 140 would cause the outdoor signal device 124 to output the third output signal 154 (e.g., the red light) instead of the first output signal 150 (e.g., the green light). Instead, the safety system 102 of the illustrated example prevents false or improper activation of an alarm or other warning indicative of a presence of a pedestrian in the first pedestrian zone 128 due to a vehicle entering the first pedestrian zone 128 when a pedestrian is not present in the first pedestrian zone 128. The controller 140 of the illustrated example maintains the first pedestrian zone 128 in a deactivated state (e.g., discontinues monitoring the first pedestrian zone 128) until the first trigger of the first vehicle detector 134 is in a non-triggered state or condition (i.e., the vehicle 10 no longer crosses over the first trigger line 134a after it has left the first pedestrian zone 128).

Although the first pedestrian zone 128 is in a deactivated mode or state (e.g., or monitoring of the first pedestrian zone 128 is disabled), the second pedestrian scanner 120b of the illustrated example continues to monitor the second pedestrian zone 130 for the presence of a person. Thus, if a person (e.g., the person 12) enters the second pedestrian zone 130 (e.g., jumps down from the dock leveler 118), the second pedestrian scanner 120b of the illustrated example will detect the presence of the person in the second pedestrian zone 130 even if the vehicle 10 is in the first pedestrian zone 128 and the first pedestrian zone 128 is in a deactivated state (e.g., a disabled state). In turn, the controller 140 of the illustrated example will cause the outdoor signal device 124 to output a signal (e.g., initiate the third output signal 154 and the fourth output signal 156) indicative of a person (e.g., the person 12) being present at the loading dock 100 to alert the driver of the vehicle to stop backing into the loading dock 100.

In another example, when a vehicle (e.g., the vehicle 10) moves toward the dock face 110 and interrupts the second trigger line 136a of the second vehicle detector 136 and the second pedestrian scanner 120b does not detect a person (e.g., the person 12) in the second pedestrian zone 130, the controller 140 of the illustrated example deactivates or disables the second pedestrian scanner 120b to prevent the second pedestrian scanner 120b from identifying a vehicle (e.g., the vehicle 10) as a person when the vehicle enters the second pedestrian zone 130. To deactivate the second pedestrian zone 130, the controller 140 of the illustrated example temporarily turns off the second pedestrian scanner 120b or ignores the input signal 142b of the second pedestrian scanner 120b. In other words, the controller 140 disables monitoring of the second pedestrian zone 130. Thus, prior to a vehicle (e.g., the vehicle 10) reaching or crossing into the second pedestrian zone 130, the second pedestrian zone 130 is in a deactivated mode or state. In this manner, the vehicle does not activate (e.g., trigger) the second pedestrian scanner 120b (or, alternatively, the output of the second pedestrian scanner 120b is ignored), thereby preventing the controller 140 from causing the outdoor signal device 124 to output a signal that is representative of a person being present in the second pedestrian zone 130. The controller 140 maintains the second pedestrian zone 130 in a deactivate state (e.g., discontinues monitoring the second pedestrian zone 130) until the second vehicle detector 136 is in a non-triggered state or condition (i.e., the vehicle no longer crosses the second trigger line 136a after it has left the second pedestrian zone 130).

Figure 2:
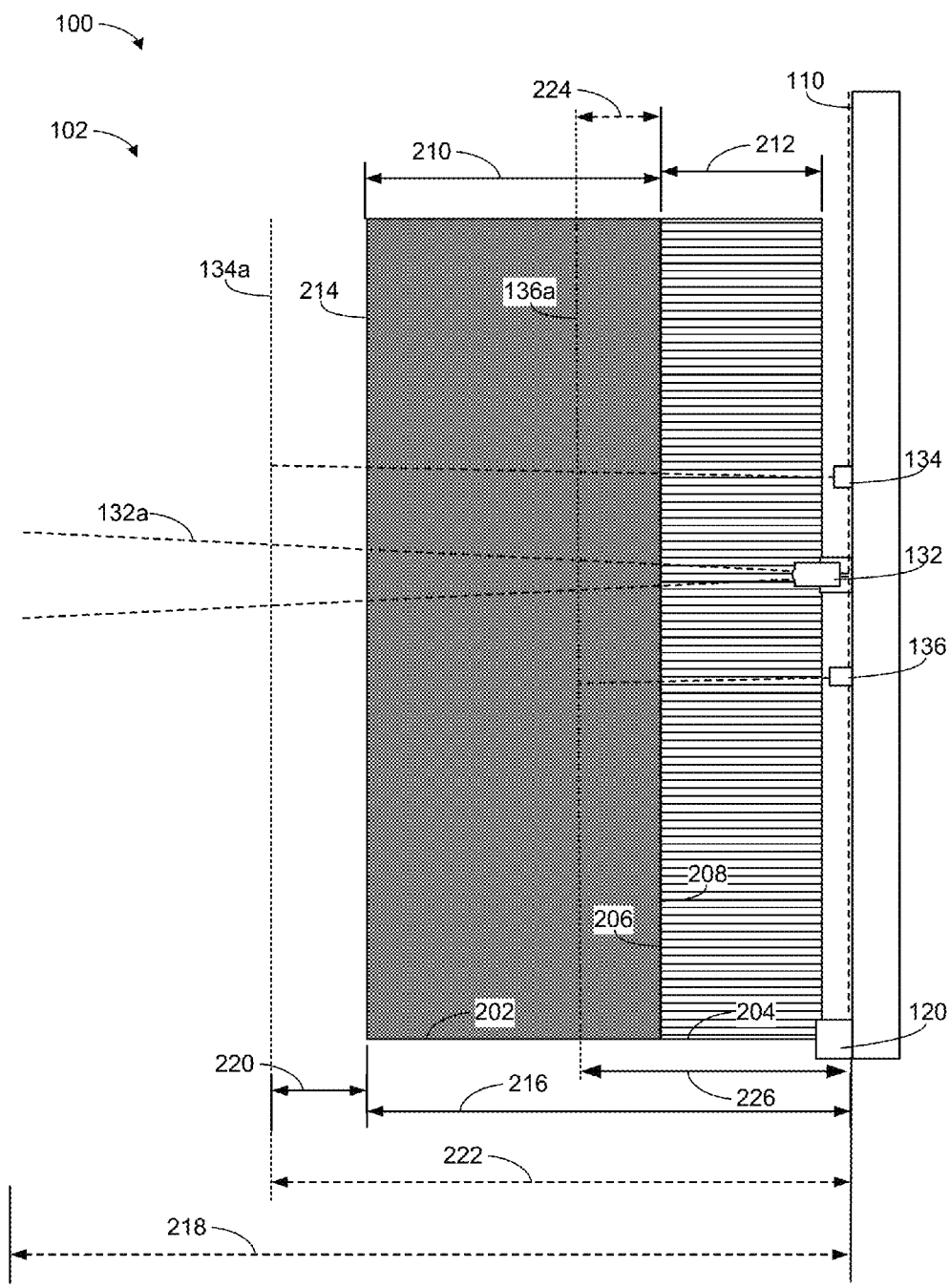
FIG. 2 is a plan view of the example loading dock of FIG. 1.

FIG. 2 is a plan view of the loading dock 100 of FIG. 1. Referring to FIG. 2, the first pedestrian zone 128 of the illustrated example is defined by a first perimeter 202 that is different than a second perimeter 204 defining the second pedestrian zone 130. The first pedestrian zone 128 of the illustrated example is immediately adjacent (e.g., juxtaposed relative to) the second pedestrian zone 130. Thus, the first pedestrian zone 128 of the illustrated example does not overlap the second pedestrian zone 130. Although the first pedestrian zone 128 does not overlap the second pedestrian zone 130, a leading edge 206 of the second perimeter 204 of the illustrated example shares a common boundary with a rear edge 208 of the first perimeter 202. In other words, the rear edge 208 and the leading edge 206 of the illustrated example are the same. In some examples, the first pedestrian zone 128 may be spaced from the second pedestrian zone 130 (e.g., such that the leading edge 206 is spaced from the rear edge 208). A width of the first pedestrian zone 128 and/or the second pedestrian zone 130 may be similar or equal to a width of the loading dock 100 and/or at least a width of the doorway 108.

The first pedestrian zone 128 and/or the second pedestrian zone 130 extend different lengths from the dock face 110. In some examples, the first pedestrian zone 128 and/or the second pedestrian zone 130 are configured to sense objects present at the loading dock 100 at different ranges (e.g., approximately 3 ft., 6 ft., 9 ft., and 12 ft.) from the dock face 110 and each covers a different area extending from the dock face 110.

In the illustrated example, the first pedestrian zone 128 projects a first length 210 (e.g., between 4 feet and 8 feet) from the leading edge 206 of the second pedestrian zone 130. The leading edge 206 of the second pedestrian zone 130 projects a second length 212 from the dock face 110. Thus, a leading edge 214 of the first pedestrian zone 128 projects a third length 216 from the dock face 110 that is greater than the second length 212 of the second pedestrian zone 130. For example, the third length 216 may be approximately 8 to 12 feet from the dock face 110 and the second length 212 may be approximately 0 to 8 feet from the dock face 110.

To sense or detect a vehicle (e.g., the vehicle 10) approaching the loading dock 100, the vehicle monitor sensor 132 of the illustrated example projects the sensing projection 132a a fourth length 218 from the dock face 110. The fourth length 218 of the illustrated example is greater than the third length 216. In some examples, the fourth length 218 is approximately between 25 feet and 35 feet from the dock face 110 of the loading dock 100.

To detect a vehicle before it enters the first pedestrian zone 128, the first trigger line 134a of the first vehicle detector 134 of the illustrated example projects a distance 220 (e.g., one to three feet) from the leading edge 214 of the first pedestrian zone 128. Thus, the first trigger line 134a of the illustrated example projects a fifth length 222 from the dock face 110 of the loading dock 100 that is greater than the third length 216 but less than the fourth length 218. For example, a difference between the fifth length 222 and the third length 216 may be between approximately one foot and three feet. In some examples, depending on a length of the third length 216, the fifth length 222 may be approximately between 9 feet and 15 feet from the dock face 110.

Similarly, to detect a vehicle before it enters the second pedestrian zone 130, the second trigger line 136a of the second vehicle detector 136 of the illustrated example projects a distance 224 (e.g., one to three feet) from the leading edge 206 of the second pedestrian zone 130. The second trigger line 136a of the illustrated example projects a sixth length 226 from the dock face 110 of the loading dock 100 that is greater than the second length 212 and less than the third length 216. For example, a difference between the sixth length 226 and the second length 212 may be between approximately one foot and three feet. In some examples, depending on the second length 212, the sixth length 226 may be approximately between 1 foot and 12 feet from the dock face 110. The lengths 210, 212, 216, 218, 220, 222, 224, and/or 226 of the illustrated example are in a direction non-parallel or perpendicular relative to the dock face 110.

Figure 3:
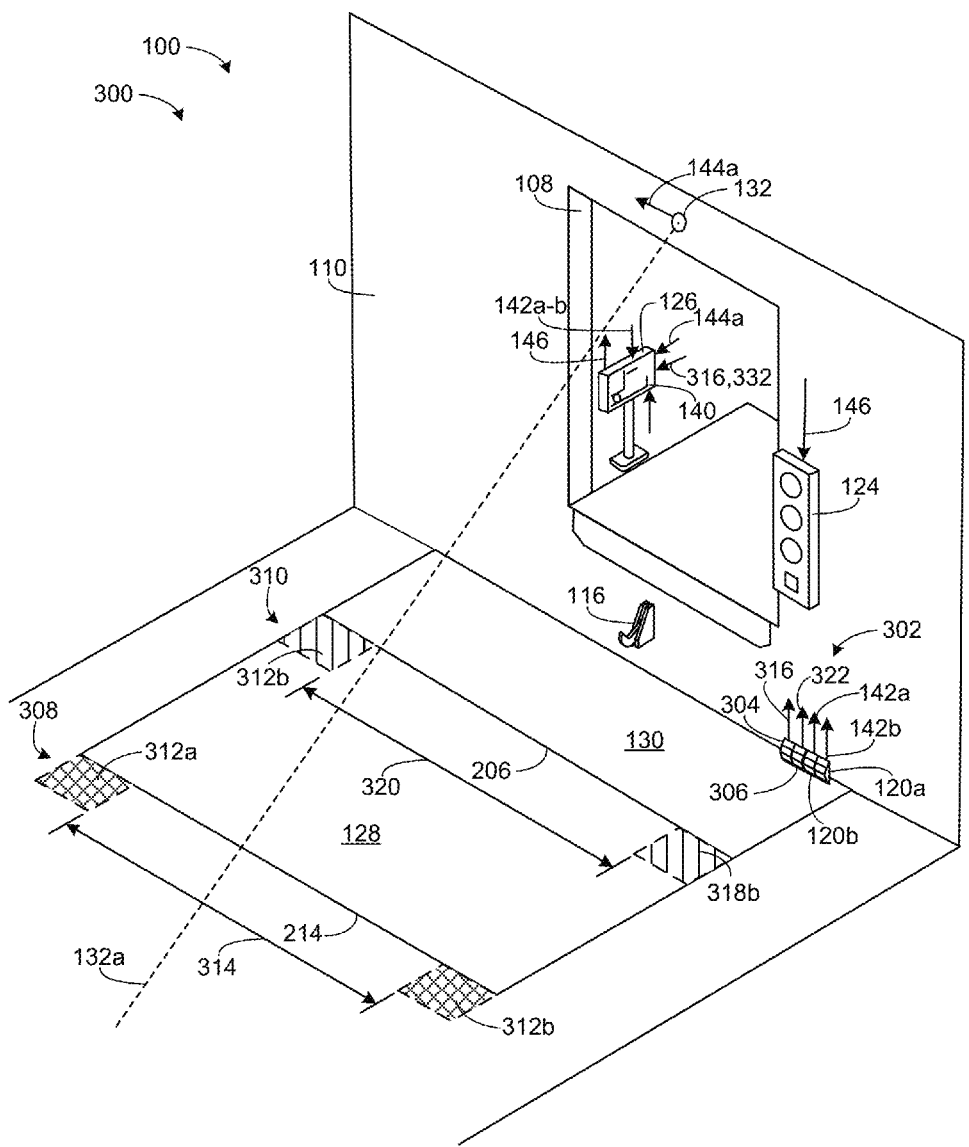
FIG. 3 is a perspective view of another example loading dock implemented with another safety system disclosed herein.

FIG. 3 illustrates another example safety system 300 disclosed herein. In some examples, the safety system 300 may be used to implement the loading dock 100 of FIG. 1 (e.g., in place of the safety system 102). Those components of the example safety system 300 of FIG. 3 that are substantially similar or identical to the components of the safety system 102 described above and that have functions substantially similar or identical to the functions of those components will not be described in detail again below. Instead, the interested reader is referred to the above corresponding descriptions. To facilitate this process, similar reference numbers will be used for like structures. For example, the safety system 300 of the illustrated example includes a first pedestrian zone 128, a second pedestrian zone 130, a vehicle monitor sensor 132, an outdoor signal device 124, an indoor signal device 126, and/or a controller 140.

To detect a vehicle 10 moving toward the dock face 110, the safety system 300 of the illustrated example includes the vehicle monitor sensor 132 to provide a sensing projection 132a. For example, the sensing projection 132a of the illustrated example detects motion of the vehicle approaching or moving toward the loading dock 100 (e.g., between about 25 feet and 35 feet from the dock face 110).

To monitor the first pedestrian zone 128 and the second pedestrian zone 130, the safety system 300 of the illustrated example includes a pedestrian scanner system 302 that provides both the pedestrian zones and the trigger zones. For example, the pedestrian scanner system 302 of the illustrated example includes a first pedestrian scanner 120a associated with the first pedestrian zone 128 and a second pedestrian scanner 120b associated with the second pedestrian zone 130. In addition, the pedestrian scanner system 302 of the illustrated example of FIG. 3 includes a first vehicle detector 304 to detect a vehicle prior to entering the first pedestrian zone 128 and a second vehicle detector 306 to detect a vehicle prior to entering the second pedestrian zone 130. More specifically, the first vehicle detector 304 monitors a first disable zone 308 adjacent (e.g., immediately in front of) the leading edge 214 of the first pedestrian zone 128, and the second vehicle detector 306 monitors a second disable zone 310 adjacent (e.g., immediately in front of) the leading edge 206 of the second pedestrian zone 130. In the example of FIG. 3, the first pedestrian scanner 120a, the second pedestrian scanner 120b, the first vehicle detector 304 and the second vehicle detector 306 of the illustrated example are provided by a single sensor. However, in some examples, the pedestrian scanner system 302 may instead be implemented via a plurality of sensors.

The first vehicle detector 304 of the illustrated example includes a first trigger area 312a and a second trigger area 312b spaced from the first trigger area 312a. To distinguish between a person and a vehicle, the first trigger area 312a is spaced from the second trigger area 312b a distance 314 (e.g., a width in a horizontal direction parallel to the dock face 110) that is a width of a trailer of a vehicle at a loading dock (e.g., a semi-trailer) and/or a width of the doorway 108, but larger than a human being. To this end, the first vehicle detector 304, via the first trigger area 312a and the second trigger area 312b, is configured to detect objects having a width significantly greater than a width of a person. More specifically, the first vehicle detector 304 detects the presence of a vehicle when an object is detected in the first trigger area 312a and the second trigger area 312b contemporaneously or simultaneously. For example, if a person is standing at the loading dock 100 and enters the first trigger area 312a, the second trigger area 312b remains in a non-triggered state. As such, the first vehicle detector 304 provides an input signal 316 to the controller 140 representative of the vehicle being absent from, or not detected at, the loading dock 100. In contrast, when a vehicle approaches the first pedestrian zone 128, the vehicle will be present in both the first trigger area 312a and the second trigger area 312b contemporaneously or simultaneously. In turn, the first vehicle detector 304 provides the input signal 316 to the controller 140 representative of detecting a vehicle about to enter (e.g., in front of) the first pedestrian zone 128.

Similarly, the second vehicle detector 306 of the illustrated example includes a third trigger area 318a and a fourth trigger area 318b spaced from the third trigger area 318a. To distinguish between a person and a vehicle, the third trigger area 318a is spaced from the fourth trigger area 318b a distance 320 (e.g., a width in a horizontal direction parallel to the dock face 110) that is a width of a trailer of the vehicle at a loading dock (e.g., a semi-trailer) and/or the width of the doorway 108, but larger than a human being. To this end, the second vehicle detector 306, via the third trigger area 318a and the fourth trigger area 318b, is configured to detect objects having a width significantly greater than a width of a person. More specifically, the second vehicle detector 306 detects the presence of a vehicle when an object is detected in both the third trigger area 318a and the fourth trigger area 318b contemporaneously or simultaneously. When the third and fourth trigger areas 318a and 318b are triggered contemporaneously or simultaneously, the second vehicle detector 306 provides an input signal 322 to the controller 140 representative of the second vehicle detector 306 detecting the vehicle before it enters the second pedestrian zone 130. In some examples, the controller 140 may be configured to detect the vehicle at the second pedestrian zone 130 when an object is detected or present in the first trigger area 312a, the second trigger area 312b, the third trigger area 318a, and the fourth trigger area 318b contemporaneously or simultaneously.

Figure 4:
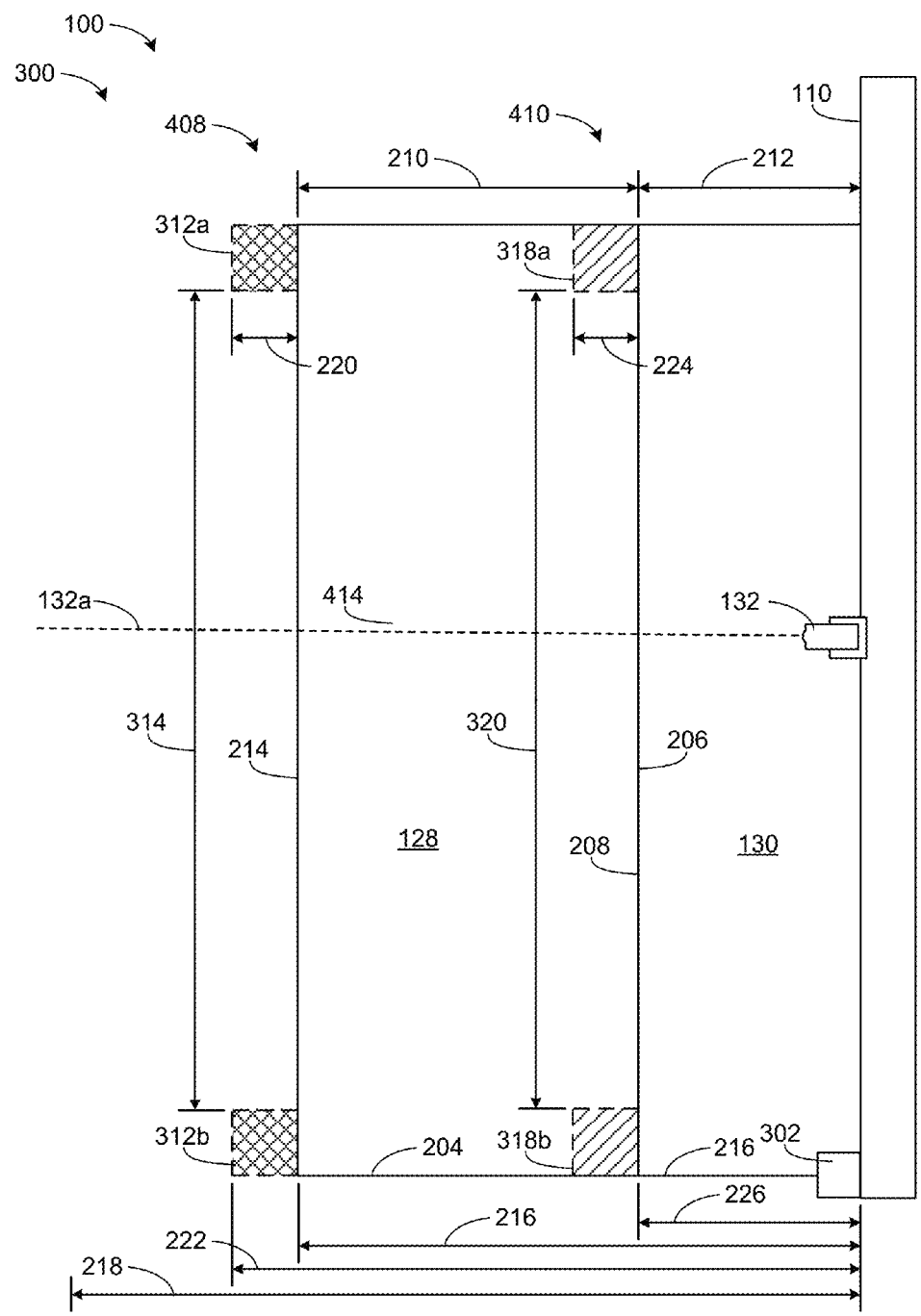
FIG. 4 is a plan view of the example loading dock of FIG. 3.

FIG. 4 is a plan view of the loading dock 100 of FIG. 3. The first trigger area 312a and the second trigger area 312b of the illustrated example are positioned in front of the leading edge 214 of the first pedestrian zone 128 to enable detection of a vehicle before it enters the first pedestrian zone 128. Similarly, the third trigger area 318a and the fourth trigger area 318b of the illustrated example are positioned in front of the leading edge 206 of the second pedestrian zone 130 to enable detection of a vehicle before it enters the second pedestrian zone 130. The first trigger area 312a and the second trigger area 312b of the illustrated example may be positioned (e.g., distances perpendicular or non-parallel) relative to the dock face 110 and/or the leading edges 206 and 214 corresponding to the lengths 210, 212, 216, 218, 220, 222, 224, and/or 226 of FIG. 2.

Figure 5:
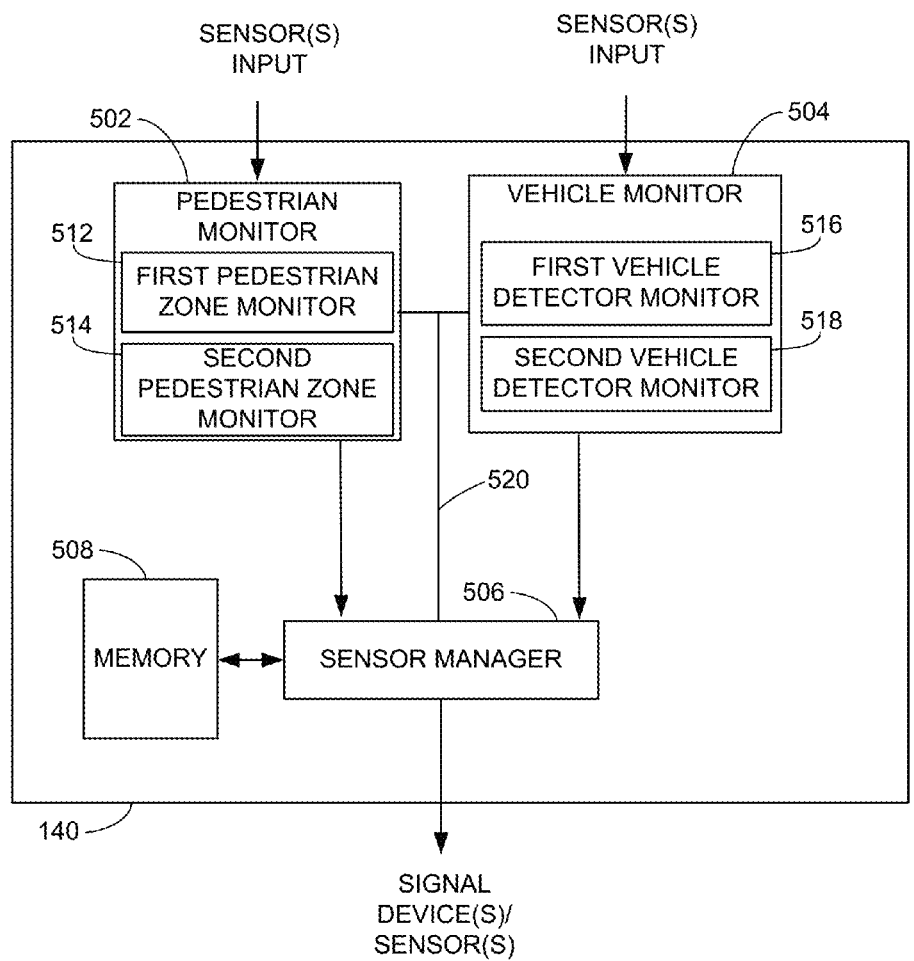
FIG. 5 is a block diagram representative of an example implementation of an example controller that may be used to implement the example safety systems of FIGS. 1-4.

FIG. 5 is a block diagram representative of an example implementation of the example controller 140 of FIGS. 1-4. Referring to FIG. 5, the controller 140 of the illustrated example includes an example pedestrian monitor 502, an example vehicle monitor 504, an example sensor manager 506 and/or an example memory 508. The pedestrian monitor 502 of the illustrated example includes an example first pedestrian zone monitor 512 and an example second pedestrian zone monitor 514. The example vehicle monitor 504 of the illustrated example includes an example first vehicle detector monitor 516 and an example second vehicle detector monitor 518. The example pedestrian monitor 502, the example vehicle monitor 504, the example sensor manager 506, and/or the example memory 508 of the illustrated example are in communication via a communication bus 520. The controller 140 of the illustrated example is communicatively coupled (e.g., via an input/output interface) to one or more loading dock devices such as, for example, one or more of the first pedestrian scanner 120a, the second pedestrian scanner 120b, the vehicle monitor sensor 132, the first vehicle detector 134, 304, the second vehicle detector 136, 306, the outdoor signal device 124, the indoor signal device 126, and/or any other device that may be used in conjunction with the loading dock 100 of FIGS. 1-4.

The pedestrian monitor 502 of the illustrated example of FIG. 5 determines the presence (or absence) of a pedestrian or forktruck in the first pedestrian zone 128 and the second pedestrian zone 130 adjacent to the dock face 110 of the loading dock 100. To determine the presence and/or status of a person at the loading dock 100, the pedestrian monitor 502 of the illustrated example receives (e.g., via an input/output interface) the input signals 142a and 142b provided by the first pedestrian scanner 120a and the second pedestrian scanner 120b, respectively.

To determine whether a person is present or absent in the first pedestrian zone 128, the pedestrian monitor 502 of the illustrated example includes the first pedestrian zone monitor 512. In particular, the first pedestrian zone monitor 512 analyzes the input signal 142a to determine the presence of a person in the first pedestrian zone 128. For example, the first pedestrian zone monitor 512 of the illustrated example determines that a person is present in the first pedestrian zone 128 when the input signal 142a received from the first pedestrian scanner 120a is in a first state (e.g., a triggered or interrupted state or condition). The first pedestrian zone monitor 512 determines or verifies the absence of a person in the first pedestrian zone 128 when the input signal 142a received from the first pedestrian scanner 120a is in a second state (e.g., a non-triggered or uninterrupted state or condition).

To determine whether a person is present or absent in the second pedestrian zone 130, the pedestrian monitor 502 of the illustrated example includes the second pedestrian zone monitor 514. In particular, the second pedestrian zone monitor 514 analyzes the input signal 142b to determine the presence of a person in the second pedestrian zone 130. For example, the second pedestrian zone monitor 514 of the illustrated example determines that a person is present in the second pedestrian zone 130 when the input signal 142b received from the second pedestrian scanner 120b is in a first state (e.g., a triggered or interrupted state or condition). The second pedestrian zone monitor 514 determines or verifies the absence of a person in the second pedestrian zone 130 when the input signal 142b received from the second pedestrian scanner 120b is in a second state (e.g., a non-triggered or uninterrupted state or condition).

Based on the analysis of the input signals 142a and 142b by the first pedestrian zone monitor 512 and the second pedestrian zone monitor 514, respectively, the pedestrian monitor 502 of the illustrated example determines or outputs a pedestrian presence signal. For example, the pedestrian monitor 502 provides or communicates pedestrian presence data determined by the first pedestrian zone monitor 512 and the second pedestrian zone monitor 514 to the sensor manager 506. In some examples, the pedestrian monitor 502 communicates the pedestrian presence data to the memory 508 and the sensor manager 506 retrieves the pedestrian presence data from the memory 508.

The vehicle monitor 504 of the illustrated example detects a motion or movement of a vehicle (e.g., the vehicle 10) as the vehicle 12 moves toward the loading dock 100. To detect a vehicle moving toward the dock face 110, the vehicle monitor 504 receives an input signal(s) from a vehicle sensor system such as, for example, the vehicle sensor system 122 and/or the vehicle monitor sensor 132. For example, the example vehicle monitor 504 of the illustrated example receives and/or analyzes the input signal 144a from the vehicle monitor sensor 132 to determine a vehicle (e.g., the vehicle 10) approaching the loading dock 100. In the illustrated example, the vehicle monitor 504 of the illustrated example determines that the vehicle 10 is present when the input signal 144a received from the vehicle monitor sensor 132 is in a first state (e.g., a triggered or interrupted state or condition) and determines or verifies the absence of the vehicle 10 when the input signal 144a received from the vehicle monitor sensor 132 is in a second state (e.g., a non-triggered or uninterrupted state or condition).

Additionally, the example vehicle monitor 504 of the illustrated example detects or senses a position of a vehicle near a specific pedestrian zone or area adjacent the dock face 110. For example, the vehicle monitor 504 of the illustrated example determines when the vehicle is in the vicinity of (e.g., immediately adjacent or near) the first pedestrian zone 128 and/or the second pedestrian zone 130.

To determine or detect when a vehicle is near (e.g., in front of or entering) a first sensed zone (e.g., the first pedestrian zone 128), the first vehicle detector monitor 516 of the illustrated example receives the input signal 144b from the first vehicle detector 134 of FIGS. 1 and 2 and analyzes the input signal 144b to determine whether the signal is representative of a first state (e.g., a triggered state) or a second state (e.g., a non-triggered state). For example, the first vehicle detector monitor 516 determines that a vehicle is present at (e.g., in or adjacent) the first pedestrian zone 128 when the first vehicle detector 134 is in the first state, and the first vehicle detector monitor 516 determines that the vehicle is not present in the first pedestrian zone 128 when the first vehicle detector 134 is in the second state.

In some examples, the first vehicle detector monitor 516 receives the input signals 316 from the first vehicle detector 304 of FIGS. 3 and 4. In some such examples, the first vehicle detector monitor 516 analyzes the input signal 316 and determines that a vehicle is near the first pedestrian zone 128 when the input signal 316 from the first vehicle detector 304 is in a first state (e.g., a triggered state), and a vehicle is not present near the first pedestrian zone 128 when the input signal 316 is in a second state (e.g., a non-triggered state). For example, the first vehicle detector monitor 516 determines that the first vehicle detector 304 is in the first state when the first trigger and the second trigger are contemporaneously in a triggered state and determines that the first vehicle detector 304 is in the second state when the first trigger and the second trigger are not contemporaneously in a triggered state.

To determine or detect when the vehicle is near a second sensed zone (e.g., the second pedestrian zone 130), the second vehicle detector monitor 518 of the illustrated example receives the input signal 144c from the second vehicle detector 136 of FIGS. 1 and 2 and analyzes the input signal 144c to detect whether the signal is representative of a first state (e.g., a triggered state) or a second state (e.g., a non-triggered state). For example, the second vehicle detector monitor 518 detects that a vehicle is near the second pedestrian zone 130 when the second vehicle detector 136 is in the first state and the second vehicle detector monitor 518 determines that the vehicle is not present when the second vehicle detector 136 is in the second state.

In some examples, the second vehicle detector monitor 518 receives the input signal 322 from the second vehicle detector 306 of FIGS. 3 and 4. In some such examples, the second vehicle detector monitor 518 of the illustrated example determines that a vehicle is near the second pedestrian zone 130 when the input signal 322 from the second vehicle detector 306 is in a first state (e.g., a triggered state), and a vehicle is not present near the second pedestrian zone 130 when the input signal 322 is in the second state (e.g., a non-triggered state). For example, the second vehicle detector monitor 518 determines that the second vehicle detector 306 is in the first state when the third trigger and the fourth trigger are contemporaneously in a triggered state and determines that the second vehicle detector 306 is in the second state when the third trigger and the fourth trigger are not contemporaneously in a triggered state.

The vehicle monitor 504 of the illustrated example provides or communicates to the sensor manager 506 a vehicle presence signal determined by the first vehicle detector monitor 516 and the second vehicle detector monitor 518. In some examples, the vehicle monitor 504 communicates the vehicle presence data to the memory 508 and the sensor manager 506 retrieves the vehicle presence data from the memory 508.

Based on the pedestrian presence data and the vehicle presence data provided by the pedestrian monitor 502 and the vehicle monitor 504, the sensor manager 506 of the illustrated example controls the outdoor signal device 124 and/or the indoor signal device 126. For example, the sensor manager 506 of the illustrated example activates the first output signal 150 (e.g., a green light) when the pedestrian monitor 502 determines or verifies that a person is not present in the first pedestrian zone 128 or the second pedestrian zone 130, and the vehicle monitor 504 determines that a vehicle is not present at the loading dock 14. In some examples, the sensor manager 506 of the illustrated example activates the second output signal 152 (e.g., a yellow light) when the pedestrian monitor 502 determines that a person is not present in the first pedestrian zone 128 or the second pedestrian zone 130 and the vehicle monitor 504 detects a vehicle moving toward the dock face 110. In some examples, the sensor manager 506 of the illustrated example activates the third output signal 154 (e.g., a red light) when the pedestrian monitor 502 detects a person in the first pedestrian zone 128 or the second pedestrian zone 130, and the vehicle monitor 504 does not detect the a vehicle moving toward the loading dock 100. In some examples, the sensor manager 506 of the illustrated example activates the third output signal 154 (e.g., a red light) and the fourth output signal 156 (e.g., an audible alarm) when the pedestrian monitor 502 detects a person in the first pedestrian zone 128 or the second pedestrian zone 130, and the vehicle monitor 504 detects a vehicle moving toward the dock face 110.

Additionally, the sensor manager 506 of the illustrated example selectively deactivates the first pedestrian zone 128 and/or the second pedestrian zone 130. In some examples, to selectively deactivate the first pedestrian zone 128 and/or the second pedestrian zone 130, the sensor manager 506 commands the first pedestrian scanner 120a or the second pedestrian scanner 120b to temporarily deactivate (e.g., by removing power to the first pedestrian scanner 120a and/or the second pedestrian scanner 120*b*). In some examples, to selectively deactivate the first pedestrian zone 128 and/or the second pedestrian zone 130, the sensor manager 506 may temporarily ignore the input signals 142*a* and 142*a* provided by the first pedestrian scanner 120*a* and the second pedestrian scanner 120*b*, respectively.

For example, the sensor manager 506 selectively deactivates the first pedestrian scanner 120*a* when the pedestrian monitor 502 (e.g., the first pedestrian zone monitor 512) does not detect the presence of a person in the first pedestrian zone 128 and the vehicle monitor 504 (e.g., the first vehicle detector monitor 516) detects the first vehicle detector 134 in the first state (e.g., a triggered state). In some such examples, the sensor manager 506 causes the first pedestrian scanner 120*a* to turn off. In some such examples, the sensor manager 506 ignores the input signal 142*a* when the vehicle 10 enters the first pedestrian zone 128.

The sensor manager 506 of the illustrated example selectively deactivates the second pedestrian scanner 120*b* when the pedestrian monitor 502 (e.g., the second pedestrian zone monitor 514) does not detect the presence of a person in the second pedestrian zone 130 when the vehicle monitor 504 (e.g., the second vehicle detector monitor 518) detects the second vehicle detector 136 in the first state (e.g., a triggered state). In some such examples, the sensor manager 506 causes the second pedestrian scanner 120*b* to turn off. In some such examples, the sensor manager 506 of the illustrated example ignores the input signal 142*b* when the vehicle 10 enters the second pedestrian zone 130.

While an example manner of implementing the controller 140 of FIGS. 1-4 is illustrated in FIG. 5, one or more of the elements, processes and/or devices illustrated in FIG. 5 may be combined, divided, re-arranged, omitted, eliminated and/or implemented in any other way. Further, the example pedestrian monitor 502, the example vehicle monitor 504, the example sensor manager 506, the example memory 508, the example first pedestrian zone monitor 512, the example second pedestrian zone monitor 514, the example first vehicle detector monitor 516, the example second vehicle detector monitor 518 and/or, more generally, the example controller 140 of FIG. 5 may be implemented by hardware, software, firmware and/or any combination of hardware, software and/or firmware. Thus, for example, any of the example pedestrian monitor 502, the example vehicle monitor 504, the example sensor manager 506, the example memory 508, the example first pedestrian zone monitor 512, the example second pedestrian zone monitor 514, the example first vehicle detector monitor 516, the example second vehicle detector monitor 518 and/or, more generally, the example controller 140 of FIG. 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example pedestrian monitor 502, the example vehicle monitor 504, the example sensor manager 506, the example memory 508, the example first pedestrian zone monitor 512, the example second pedestrian zone monitor 514, the example first vehicle detector monitor 516, the example second vehicle detector monitor 518 is/are hereby expressly defined to include a tangible computer readable storage device or storage disk such as a memory, a digital versatile disk (DVD), a compact disk (CD), a Blu-ray disk, etc. storing the software and/or firmware. Further still, the example controller 140 of FIGS. 1-4 may include one or more elements, processes and/or devices in addition to, or instead of, those illustrated in FIG. 5, and/or may include more than one of any or all of the illustrated elements, processes and devices.

Figure 6:
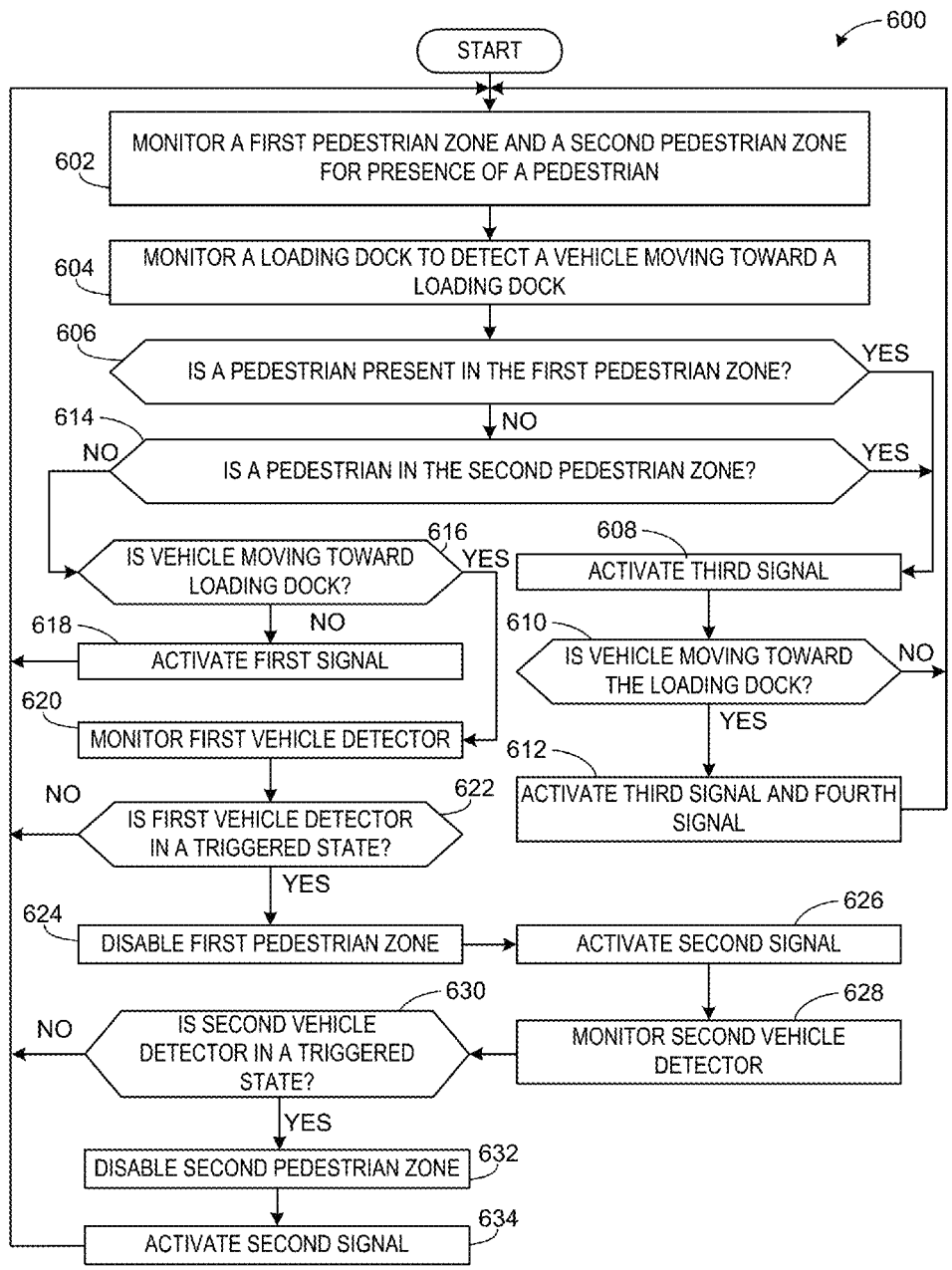
FIG. 6 is a flowchart representative of example machine readable instruction which may be executed to implement the example controller of FIG. 5.

A flowchart representative of example machine readable instructions which may be executed to implement the example controller 140 of FIG. 5 is shown in FIG. 6. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example controller 140 may alternatively be used. For example, the order of execution of the blocks may be changed, and/or some of the blocks described may be changed, eliminated, or combined.

As mentioned above, the example process of FIG. 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Referring to FIG. 6, the program 600 of FIG. 6 begins at block 602 when the example pedestrian monitor 502 monitors the loading dock 100 for the presence of a person in the first pedestrian zone 128 and the second pedestrian zone 130 (block 602), and the vehicle monitor 504 monitors the loading dock 100 to detect a vehicle moving toward the loading dock 100 or the dock face 110 (block 604). During monitoring, the first pedestrian zone monitor 512 detects if a person is present in the first pedestrian zone 128 (block 606). If the first pedestrian zone monitor 512 detects the presence of a person in the first pedestrian zone 128 at block 606, the sensor manager 506 activates the third output signal 154 (e.g., the red light) of the outdoor signal device 124 (block 608).

After the third signal is in the activated state, the example vehicle monitor 504 determines if a vehicle is moving toward the dock face 110 (block 610). If the example vehicle monitor 504 determines that a vehicle is not moving toward the dock face 110, the program returns to block 602. If the vehicle monitor 504 determines that a vehicle is moving toward the dock face 110 at block 610, the example sensor manager 506 activates the fourth output signal 156 (e.g., the alarm) of the example outdoor signal device 38 (block 612).

If the first pedestrian zone monitor 512 does not detect the presence of a person (e.g., the person 12) at block 606, the second pedestrian zone monitor 514 determines if a person is present in the second pedestrian zone 130 (block 614). If the example second pedestrian zone monitor 514 detects the presence of a person in the second pedestrian zone 130, the sensor manager 506 activates the third output signal of the outdoor signal device 124 (block 608). The example vehicle monitor 504 then detects if a vehicle is moving toward the loading dock 100 (block 610). If the vehicle monitor 504 determines that a vehicle is not moving toward the loading dock 100, the program returns to block 602. Further, if the example vehicle monitor 504 detects a vehicle moving toward the loading dock 100 at block 610, the example sensor manager 506 activates the third output signal 154 and the fourth output signal 156 of the outdoor signal device 124 (block 612).

If the first pedestrian zone monitor 512 and the second pedestrian zone monitor 514 do not detect the presence of a person at the loading dock 100, the vehicle monitor 504 determines if a vehicle is moving toward the loading dock 100 (block 616). If the vehicle monitor 504 does not detect a vehicle moving toward the loading dock 100, the sensor manager 506 activates the first output signal 150 (e.g., the green light) of the outdoor signal device 124 (block 618).

If a vehicle is detected moving toward the loading dock 100 at block 616, the first vehicle detector monitor 516 monitors the first vehicle detector 134, 304 (block 620). For example, the first vehicle detector monitor 516 detects if the first vehicle detector 134, 304 is in a triggered state (block 622). If the first vehicle detector monitor 516 detects the first vehicle detector 134, 304 in the triggered state at block 622, the sensor manager 506 disables the first pedestrian zone 128 (block 624) and activates the second output signal 152 (e.g., the yellow light) of the outdoor signal device 124 (block 626). For example, the controller 140 disables monitoring of the first pedestrian zone 128 (e.g., prior to the vehicle entering the first pedestrian zone 128).

The second vehicle detector monitor 518 monitors the second vehicle detector 136, 306 (block 628). For example, the second vehicle detector monitor 518 detects if the second vehicle detector 136, 306 is in a triggered state (block 630). If the second vehicle detector 136, 306 is in a triggered state, the sensor manager 506 disables the second pedestrian zone 130 (block 632) and activates the second output signal 152 (e.g., the yellow light) of the outdoor signal device 124 (block 634). For example, the controller 140 disables monitoring of the second pedestrian zone 130 (e.g., prior to the vehicle entering the second pedestrian zone 130).

Figure 7:
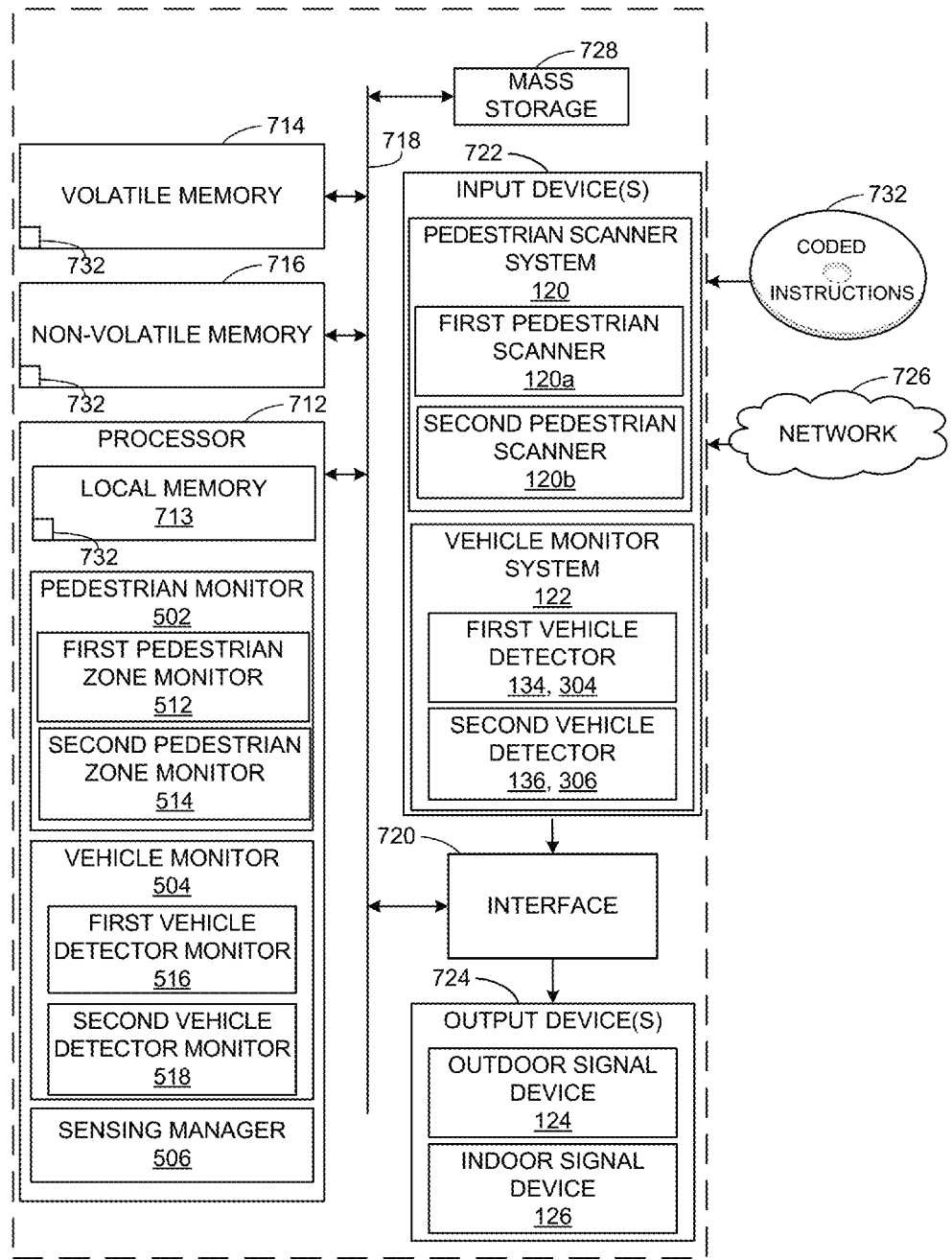
FIG. 7 is a block diagram of an example processor platform capable of executing the instructions of FIG. 6 to implement an example controller of FIG. 5.

FIG. 7 is a block diagram of an example processor platform 700 capable of executing the instructions of FIG. 6 to implement the example controller 140 FIG. 5. The processor platform 700 can be, for example, a server, a personal computer, any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The example processor 712 executes instructions to implement the example pedestrian monitor 502, the example vehicle monitor 504, the example sensor manager 506, the example first pedestrian zone monitor 512, the example second pedestrian zone monitor 514, the example first vehicle detector monitor 516, and the example second vehicle detector monitor 518.

The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 714, 716 is controlled by a memory controller.

The processor platform 700 of the illustrated example also includes an interface circuit 720. The interface circuit 820 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, a microphone, a keyboard, a button, a mouse, a touchscreen, a track-pad, a trackball, isopoint and/or a voice recognition system. In the illustrated example of FIG. 7, the example input device(s) 722 implement the example pedestrian scanner system 120, the example vehicle sensor system 122, the example first pedestrian scanner 120a, the example second pedestrian sensor 120b, the example first vehicle detector 134, 304, and the example second vehicle detector 136, 306.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, and/or speakers). The interface circuit 720 of the illustrated example, thus, typically includes a graphics driver card, a graphics driver chip or a graphics driver processor. In the illustrated example of FIG. 7, the example output device(s) 724 implement the example outdoor signal device 124 and the example indoor signal device 126.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIG. 6 may be stored in the mass storage device 728, in the volatile memory 714, in the non-volatile memory 716, and/or on a removable tangible computer readable storage medium such as a CD or DVD.

THE EXAMPLES

In some examples, a sensor system for a loading dock includes at least one pedestrian sensors to monitor a first pedestrian zone and a second pedestrian zone in front of a dock face of a loading dock. In some such examples, the at least one pedestrian sensors is to attempt to detect a pedestrian in at least one of the first pedestrian zone or the second pedestrian zone. In some such examples, the first pedestrian zone is different than the second pedestrian zone. In some such examples, a first vehicle detector is to attempt to detect a vehicle near the first pedestrian zone. In some such examples, a second vehicle detector to attempt to detect the vehicle near the second pedestrian zone. In some such examples, a sensor manager is to disable the first pedestrian zone when the first vehicle detector detects the vehicle approaching the first pedestrian zone and the at least one pedestrian sensors does not detect the pedestrian in the first pedestrian zone. In some such examples, the sensor manager is to disable the second pedestrian zone when the second vehicle detector detects the vehicle approaching the second pedestrian zone and at least one of the at least pedestrian sensors does not detect the pedestrian in the second pedestrian zone.

In some examples, the first vehicle detector is positioned to detect the vehicle prior to the vehicle entering the first pedestrian zone. In some such examples, the second vehicle detector is positioned to detect the vehicle prior to the vehicle entering the second pedestrian zone.

In some examples, the first pedestrian zone is to project a first distance from the dock face of the loading dock and the second pedestrian zone is to project a second distance from the dock face, the first distance being greater than the second distance.

In some examples, the first vehicle detector is to detect a vehicle crossing a first trigger line located a third distance from the dock face of the loading dock, the third distance being greater than the first distance.

In some examples, the second vehicle detector is to detect the vehicle crossing a second trigger line located a fourth distance from the dock face, the fourth distance being greater than the second distance and less than the first distance.

In some examples, the first vehicle detector is to monitor a first disable zone immediately adjacent a forward edge of the first pedestrian zone, and the second vehicle detector is to monitor a second disable zone is immediately adjacent a forward edge of the second pedestrian zone.

In some examples, the first vehicle detector monitors a first trigger area and a second trigger area spaced from the first trigger area, and the first vehicle detector to detect the vehicle when an object is present in both the first trigger area and the second trigger area contemporaneously.

In some examples, the second vehicle detector includes a third trigger area and a fourth trigger area spaced from the third trigger area, and the second vehicle detector is to detect the vehicle when an object is present in both the third trigger area and the fourth trigger area contemporaneously.

In some examples, a sensor manager is to control a signal device, and a vehicle monitor sensor is to detect a vehicle moving toward the loading dock.

In some examples, the sensor manager is to activate a first signal of the signal device when: the at least one pedestrian sensors does not detect the presence of a pedestrian in the first pedestrian zone or the second pedestrian zone; the vehicle monitor sensor does not detect the vehicle moving toward the loading dock; the first vehicle detector does not detect the vehicle approaching the first pedestrian zone; and the second vehicle detector does not detect the vehicle approaching the second pedestrian zone.

In some examples, the sensor manager is to activate a second signal when: the at least one pedestrian sensors does not detect the presence of a pedestrian in the first pedestrian zone or the second pedestrian zone, and at least one of: the vehicle monitor sensor detects the vehicle moving toward the loading dock; the first vehicle detector detects the vehicle approaching the first pedestrian zone; or the second vehicle detector detecting the vehicle approaching the second pedestrian zone.

In some examples, the sensor manager is to activate a third signal when: the at least one pedestrian sensors detects the presence the presence of a pedestrian in the first pedestrian zone or the second pedestrian zone and: the vehicle monitor sensor does not detect the vehicle moving toward the loading dock; the first vehicle detector does not detect the vehicle approaching the first pedestrian zone; and the second vehicle detector does not detect the vehicle approaching the second pedestrian zone.

In some examples, the sensor manager is to activate a fourth signal when: the at least one pedestrian sensors detects the presence the presence of a pedestrian in the first pedestrian zone or the second pedestrian zone, and at least one of: the vehicle monitor sensor detects the vehicle moving toward the loading dock; the first vehicle detector detects the vehicle approaching the first pedestrian zone; or the second vehicle detector detecting the vehicle approaching the second pedestrian zone.

In some examples, a method includes monitoring a first pedestrian zone; monitoring a second pedestrian zone different from the first pedestrian zone, the second pedestrian zone being in front of a dock face of a loading dock and the first pedestrian zone being in front of the second pedestrian zone; monitoring for a presence of a pedestrian in the first pedestrian zone or the second pedestrian zone; attempting to detect a vehicle approaching the first pedestrian zone; discontinuing monitoring of the first pedestrian zone when the vehicle is detected approaching the first pedestrian zone and a pedestrian is not detected in the first pedestrian zone; detecting the vehicle approaching the second pedestrian zone; and discontinuing monitoring of the second pedestrian zone when the vehicle is detected approaching the second pedestrian zone and the pedestrian is not detected in the second pedestrian zone.

In some examples, the detecting of the vehicle approaching the first pedestrian zone includes detecting the vehicle prior to the vehicle entering the first pedestrian zone.

In some examples, the detecting of the vehicle approaching the second pedestrian zone includes detecting the vehicle prior to the vehicle entering the second pedestrian zone.

In some examples, a front of the first pedestrian zone is located a first distance from the dock face of the loading dock and a front of the second pedestrian zone is located a second distance from the dock face, the first distance being greater than the second distance.

In some examples, a front of a first vehicle detector is located a third distance from the dock face of the loading dock to detect the vehicle approaching the first pedestrian zone, and wherein a front of a second vehicle detector is located a fourth distance from the dock face to detect the vehicle approaching the second pedestrian zone, the third distance being greater than the first distance, and the fourth distance being greater than the second distance and less than the first distance.

In some examples, the first vehicle detector includes a first trigger area and a second trigger area laterally spaced from the first trigger area, and wherein the first vehicle detector is to detect the vehicle approaching the first pedestrian zone when an object is present in both the first trigger area and the second trigger area contemporaneously.

In some examples, the second vehicle detector includes a third trigger area and a fourth trigger area spaced from the third trigger area, and wherein the second vehicle detector is to detect the vehicle approaching the second pedestrian zone when an object is present in both the third trigger area and the fourth trigger area contemporaneously.

In some examples, a tangible computer-readable medium comprising instructions that, when executed, cause a machine to: monitor a first pedestrian zone; monitor a second pedestrian zone different from the first pedestrian zone, the second pedestrian zone being in front of a dock face of a loading dock and the first pedestrian zone being in front of the second pedestrian zone; monitor for a presence of a pedestrian in the first pedestrian zone or the second pedestrian zone; attempt to detect a vehicle approaching the first pedestrian zone; discontinue monitoring of the first pedestrian zone when the vehicle is detected approaching the first pedestrian zone and a pedestrian is not detected in the first pedestrian zone; detect the vehicle approaching the second pedestrian zone; and discontinue monitoring of the second pedestrian zone when the vehicle is detected approaching the second pedestrian zone and the pedestrian is not detected in the second pedestrian zone.

In some examples, the instructions, when executed, cause the machine to detect the vehicle prior to the vehicle entering the first pedestrian zone when detecting the vehicle approaching the first pedestrian zone.

In some examples, the instructions, when executed, cause the machine to detect the vehicle prior to the vehicle entering the second pedestrian zone when detecting the vehicle approaching the second pedestrian zone.

In some examples, the instructions, when executed, cause the machine to detect an object crossing a first trigger line of a first vehicle detector located in front of a forward edge of the first pedestrian zone when detecting the vehicle approaching the first pedestrian zone.

In some examples, the instructions, when executed, cause the machine to detect an object crossing a second trigger line of a second vehicle detector located in front of a forward edge of the second pedestrian zone when detecting the vehicle approaching the second pedestrian zone.

In some examples, the instructions, when executed, cause the machine to detect the presence of the vehicle when an object is present in both a first trigger area and a second trigger area of a first vehicle detector contemporaneously when detecting the vehicle approaching the first pedestrian zone, the first vehicle detector being located in front of a forward edge of the first pedestrian zone, the first trigger area being laterally spaced from the second trigger area.

In some examples, the instructions, when executed, cause the machine to detect the presence of the vehicle when an object is present in both a third trigger area and a fourth trigger area of a second vehicle detector contemporaneously when detecting the vehicle approaching the second pedestrian zone, the second vehicle detector being located in front of a forward edge of the second pedestrian zone, the third trigger area being laterally spaced from the fourth trigger area.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A sensor system for a loading dock, the sensor system comprising:
   at least one or more pedestrian sensors to monitor a first pedestrian zone or a second pedestrian zone in front of a dock face of a loading dock, the pedestrian sensors to detect a pedestrian in at least one of the first pedestrian zone or the second pedestrian zone, wherein a first forward edge of the first pedestrian zone to be at a first distance from a wall of the loading dock and a second forward edge of the second pedestrian zone to be at a second distance from the wall, the first distance being greater than the second distance;
   a first vehicle detector to detect a vehicle near the first pedestrian zone;
   a second vehicle detector to detect the vehicle near the second pedestrian zone; and
   a sensor manager to disable the first pedestrian zone when the first vehicle detector detects the vehicle approaching the first pedestrian zone and at least one of the pedestrian sensors does not detect the pedestrian in the first pedestrian zone, and the sensor manager to disable the second pedestrian zone when the second vehicle detector detects the vehicle approaching the second pedestrian zone and at least one of the pedestrian sensors does not detect the pedestrian in the second pedestrian zone.

2. The system of claim 1, wherein the first vehicle detector is positioned to detect the vehicle prior to the vehicle entering the first pedestrian zone, and the second vehicle detector is positioned to detect the vehicle prior to the vehicle entering the second pedestrian zone.

3. The system of claim 1, wherein the first pedestrian zone is to project across a first area from the dock face of the loading dock and the second pedestrian zone is to project across a second area from the dock face, the first area being greater than the second area.

4. The system of claim 1, wherein the first vehicle detector is to detect a vehicle crossing a first trigger line located a third distance from the dock face of the loading dock, the third distance being greater than the first distance.

5. The system of claim 4, wherein the second vehicle detector is to detect the vehicle crossing a second trigger line located a fourth distance from the dock face, the fourth distance being greater than the second distance and less than the first distance.

6. The system of claim 1, wherein the first vehicle detector is to monitor a first disable zone immediately adjacent the first forward edge of the first pedestrian zone, and the second vehicle detector is to monitor a second disable zone immediately adjacent the second forward edge of the second pedestrian zone.

7. The system of claim 1, wherein the first vehicle detector monitors a first trigger area and a second trigger area spaced from the first trigger area, and the first vehicle detector to detect the vehicle when an object is present in both the first trigger area and the second trigger area contemporaneously.

8. The system of claim 7, wherein the second vehicle detector includes a third trigger area and a fourth trigger area spaced from the third trigger area, and the second vehicle detector is to detect the vehicle when an object is present in both the third trigger area and the fourth trigger area contemporaneously.

9. The system of claim 1, wherein the sensor manager is to control a signal device, and further including a vehicle monitor sensor to detect a vehicle moving toward the loading dock.

10. The system of claim 1, wherein the first pedestrian zone does not overlap the second pedestrian zone.

11. A sensor system for a loading dock, the sensor system comprising:
at least one or more pedestrian sensors to monitor a first pedestrian zone and a second pedestrian zone in front of a dock face of a loading dock, at least one of the pedestrian sensors to detect a pedestrian in at least one of the first pedestrian zone or the second pedestrian zone, the first pedestrian zone being different than the second pedestrian zone;
a first vehicle detector to detect a vehicle near the first pedestrian zone;
a second vehicle detector to detect the vehicle near the second pedestrian zone;
a vehicle monitor sensor to detect a vehicle moving toward the loading dock; and
a sensor manager to disable the first pedestrian zone when the first vehicle detector detects the vehicle approaching the first pedestrian zone and at least one of the pedestrian sensors does not detect the pedestrian in the first pedestrian zone, the sensor manager to disable the second pedestrian zone when the second vehicle detector detects the vehicle approaching the second pedestrian zone and at least one of the pedestrian sensors does not detect the pedestrian in the second pedestrian zone, the sensor manager to control a signal device, and wherein the sensor manager is to activate a first signal of the signal device when:
the at least one or more of the pedestrian sensors do not detect the presence of a pedestrian in the first pedestrian zone or the second pedestrian zone;
the vehicle monitor sensor does not detect the vehicle moving toward the loading dock;
the first vehicle detector does not detect the vehicle approaching the first pedestrian zone; and
the second vehicle detector does not detect the vehicle approaching the second pedestrian zone.

12. The system of claim 11, wherein the sensor manager is to activate a second signal when:
the at least one or more of the pedestrian sensors do not detect the presence of a pedestrian in the first pedestrian zone or the second pedestrian zone, and at least one of:
the vehicle monitor sensor detects the vehicle moving toward the loading dock;
the first vehicle detector detects the vehicle approaching the first pedestrian zone; or
the second vehicle detector detecting the vehicle approaching the second pedestrian zone.

13. The system of claim 12, wherein the sensor manager is to activate a third signal when:
the at least one or more pedestrian sensors detect the presence of a pedestrian in the first pedestrian zone or the second pedestrian zone and:
the vehicle monitor sensor does not detect the vehicle moving toward the loading dock;
the first vehicle detector does not detect the vehicle approaching the first pedestrian zone; and
the second vehicle detector does not detect the vehicle approaching the second pedestrian zone.

14. The system of claim 13, wherein the sensor manager is to activate a fourth signal when:
the at least one or more pedestrian sensors detect the presence of a pedestrian in the first pedestrian zone or the second pedestrian zone, and at least one of:
the vehicle monitor sensor detects the vehicle moving toward the loading dock;
the first vehicle detector detects the vehicle approaching the first pedestrian zone; or
the second vehicle detector detecting the vehicle approaching the second pedestrian zone.

15. A method comprising:
monitoring a first pedestrian zone;
monitoring a second pedestrian zone different from the first pedestrian zone, the second pedestrian zone being in front of a dock face of a loading dock and the first pedestrian zone being in front of the second pedestrian zone such that a first forward edge of the first pedestrian zone to be at a first distance from a wall of the loading dock and a second forward edge of the second pedestrian zone to be at a second distance from the wall, the first distance being greater than the second distance;
monitoring for a presence of a pedestrian in at least one of the first pedestrian zone or the second pedestrian zone;
detecting a vehicle approaching the first pedestrian zone;
discontinuing monitoring of the first pedestrian zone when the vehicle is detected approaching the first pedestrian zone and a pedestrian is not detected in the first pedestrian zone;
detecting the vehicle approaching the second pedestrian zone; and
discontinuing monitoring of the second pedestrian zone when the vehicle is detected approaching the second pedestrian zone and the pedestrian is not detected in the second pedestrian zone.

16. The method of claim 15, wherein the detecting of the vehicle approaching the first pedestrian zone includes detecting the vehicle prior to the vehicle entering the first pedestrian zone.

17. The method of claim 15, wherein the detecting of the vehicle approaching the second pedestrian zone includes detecting the vehicle prior to the vehicle entering the second pedestrian zone.

18. The method of claim 15, wherein a front of a first vehicle detector is located a third distance from the dock face of the loading dock to detect the vehicle approaching the first pedestrian zone, and wherein a front of a second vehicle detector is located a fourth distance from the dock face to detect the vehicle approaching the second pedestrian zone, the third distance being greater than the first distance, and the fourth distance being greater than the second distance and less than the first distance.

19. The method of claim 18, wherein the first vehicle detector includes a first trigger area and a second trigger area laterally spaced from the first trigger area, and wherein the first vehicle detector is to detect the vehicle approaching the first pedestrian zone when an object is present in both the first trigger area and the second trigger area contemporaneously.

20. The method of claim 19, wherein the second vehicle detector includes a third trigger area and a fourth trigger area spaced from the third trigger area, and wherein the second vehicle detector is to detect the vehicle approaching the second pedestrian zone when an object is present in both the third trigger area and the fourth trigger area contemporaneously.

21. The method of claim 15, wherein the first pedestrian zone does not overlap the second pedestrian zone.

22. A tangible computer-readable medium comprising instructions that, when executed, cause a machine to:
  monitor a first pedestrian zone;
  monitor a second pedestrian zone different from the first pedestrian zone, wherein the first pedestrian zone does not overlap the second pedestrian zone, the second pedestrian zone being in front of a dock face of a loading dock and the first pedestrian zone being in front of the second pedestrian zone such that a first forward edge of the first pedestrian zone is to be at a first distance from the dock face and a second forward edge of the second pedestrian zone is to be at a second distance from the dock face, the first distance being greater than the second distance;
  monitor for a presence of a pedestrian in at least one of the first pedestrian zone or the second pedestrian zone;
  detect a vehicle approaching the first pedestrian zone;
  discontinue monitoring of the first pedestrian zone when the vehicle is detected approaching the first pedestrian zone and a pedestrian is not detected in the first pedestrian zone;
  detect the vehicle approaching the second pedestrian zone; and
  discontinue monitoring of the second pedestrian zone when the vehicle is detected approaching the second pedestrian zone and the pedestrian is not detected in the second pedestrian zone.

23. The computer-readable medium as defined in claim 22, comprising instructions that, when executed, cause the machine to detect the vehicle prior to the vehicle entering the first pedestrian zone when detecting the vehicle approaching the first pedestrian zone.

24. The computer-readable medium as defined in claim 22, comprising instructions that, when executed, cause the machine to detect the vehicle prior to the vehicle entering the second pedestrian zone when detecting the vehicle approaching the second pedestrian zone.

25. The computer-readable medium as defined in claim 22, comprising instructions that, when executed, cause the machine to detect an object crossing a first trigger line of a first vehicle detector located in front of a forward edge of the first pedestrian zone when detecting the vehicle approaching the first pedestrian zone.

26. The computer-readable medium as defined in claim 25, comprising instructions that, when executed, cause the machine to detect an object crossing a second trigger line of a second vehicle detector located in front of a forward edge of the second pedestrian zone when detecting the vehicle approaching the second pedestrian zone.

27. The computer-readable medium as defined in claim 22, comprising instructions that, when executed, cause the machine to detect the presence of the vehicle when an object is present in both a first trigger area and a second trigger area of a first vehicle detector contemporaneously when detecting the vehicle approaching the first pedestrian zone, the first vehicle detector being located in front of a forward edge of the first pedestrian zone, the first trigger area being laterally spaced from the second trigger area.

28. The computer-readable medium as defined in claim 27, comprising instructions that, when executed, cause the machine to detect the presence of the vehicle when an object is present in both a third trigger area and a fourth trigger area of a second vehicle detector contemporaneously when detecting the vehicle approaching the second pedestrian zone, the second vehicle detector being located in front of a forward edge of the second pedestrian zone, the third trigger area being laterally spaced from the fourth trigger area.

* * * * *